(12) United States Patent
Stoyanov et al.

(10) Patent No.: US 10,997,257 B2
(45) Date of Patent: May 4, 2021

(54) AGGREGATING NEWS EVENTS ON ONLINE SOCIAL NETWORKS

(71) Applicant: Facebook, Inc., Menlo Park, CA (US)

(72) Inventors: Veselin S. Stoyanov, Palo Alto, CA (US); Igor Ribiero de Assis, San Francisco, CA (US); Alexander Perelygin, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 1517 days.

(21) Appl. No.: 14/616,155

(22) Filed: Feb. 6, 2015

(65) Prior Publication Data

US 2016/0232241 A1  Aug. 11, 2016

(51) Int. Cl.
*G06F 16/9535* (2019.01)

(52) U.S. Cl.
CPC .............................. *G06F 16/9535* (2019.01)

(58) Field of Classification Search
CPC ................. G06F 17/30867; G06F 16/9535
USPC ........................................................ 707/728
See application file for complete search history.

(56) References Cited

U.S. PATENT DOCUMENTS

| | | | |
|---|---|---|---|
| 5,918,014 A | 6/1999 | Robinson | |
| 6,539,232 B2 | 3/2003 | Hendrey | |
| 6,957,184 B2 | 10/2005 | Schmid | |
| 7,069,308 B2 | 6/2006 | Abrams | |
| 7,379,811 B2 | 5/2008 | Rasmussen | |
| 7,539,697 B1 | 5/2009 | Akella | |
| 7,752,326 B2 | 7/2010 | Smit | |
| 7,836,044 B2 | 11/2010 | Kamvar | |
| 8,027,990 B1 | 9/2011 | Mysen | |
| 8,060,639 B2 | 11/2011 | Smit | |
| 8,112,529 B2 | 2/2012 | Van Den Oord | |
| 8,180,804 B1 | 5/2012 | Narayanan | |
| 8,185,558 B1 | 5/2012 | Narayanan | |
| 8,239,364 B2 | 8/2012 | Wable | |
| 8,244,848 B1 | 8/2012 | Narayanan | |
| 8,271,471 B1 | 9/2012 | Kamvar | |
| 8,271,546 B2 | 9/2012 | Gibbs | |
| 8,301,639 B1 | 10/2012 | Myllymaki | |
| 8,321,364 B1 | 11/2012 | Gharpure | |
| 8,364,709 B1 | 1/2013 | Das | |
| 8,386,465 B2 | 2/2013 | Ansari | |
| 8,407,200 B2 | 3/2013 | Wable | |
| 8,412,749 B2 | 4/2013 | Fortuna | |

(Continued)

*Primary Examiner* — Hicham Skhoun
(74) *Attorney, Agent, or Firm* — Jordan IP Law, LLC

(57) ABSTRACT

In one embodiment, a method includes accessing a first set of posts that includes a number of posts of the online social network posted within a first timeframe. In particular embodiments, each post is associated with one or more topics of a number of topics of the online social network. The method also includes determining a trending topic from the plurality of topics of the online social network; and generating a news-event object associated with the trending topic. In particular embodiments, the news-event object includes a seed post from the first set of posts and a tagging-algorithm for identifying posts matching the trending topic. The method also includes identifying, by the tagging-algorithm, one or more posts from the first set of posts that match the trending topic; and generating one or more search-results modules. In particular embodiments, each search-results module includes one or more search results.

20 Claims, 16 Drawing Sheets

(56) References Cited

U.S. PATENT DOCUMENTS

| | | |
|---|---|---|
| 8,538,960 B2 | 9/2013 | Wong |
| 8,572,129 B1 | 10/2013 | Lee |
| 8,595,297 B2 | 11/2013 | Marcucci |
| 8,601,027 B2 | 12/2013 | Behforooz |
| 8,639,725 B1 | 1/2014 | Udeshi |
| 8,732,208 B2 | 5/2014 | Lee |
| 8,751,521 B2 | 6/2014 | Lee |
| 8,782,080 B2 | 7/2014 | Lee |
| 8,868,603 B2 | 10/2014 | Lee |
| 8,918,418 B2 | 12/2014 | Lee |
| 8,935,255 B2 | 1/2015 | Sankar |
| 8,935,271 B2 | 1/2015 | Lassen |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0136419 A1 | 6/2006 | Brydon |
| 2006/0190436 A1 | 8/2006 | Richardson |
| 2007/0277100 A1 | 11/2007 | Sheha |
| 2008/0033926 A1 | 2/2008 | Matthews |
| 2008/0072180 A1 | 3/2008 | Chevalier |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0094200 A1 | 4/2009 | Baeza-Yates |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0265326 A1 | 10/2009 | Lehrman |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0125562 A1 | 5/2010 | Nair |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0321399 A1 | 12/2010 | Ellren |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0191371 A1 | 8/2011 | Elliott |
| 2011/0196855 A1 | 8/2011 | Wable |
| 2011/0218946 A1* | 9/2011 | Stern .................. H04L 12/1859 706/12 |
| 2011/0276396 A1 | 11/2011 | Rathod |
| 2011/0313992 A1 | 12/2011 | Groeneveld |
| 2011/0320470 A1 | 12/2011 | Williams |
| 2012/0005224 A1* | 1/2012 | Ahrens .................. G06Q 10/10 707/769 |
| 2012/0059708 A1 | 3/2012 | Galas |
| 2012/0136852 A1 | 5/2012 | Geller |
| 2012/0166432 A1 | 6/2012 | Tseng |
| 2012/0166433 A1 | 6/2012 | Tseng |
| 2012/0166438 A1* | 6/2012 | Wu ...................... G06F 17/3064 707/737 |
| 2012/0179637 A1 | 7/2012 | Juan |
| 2012/0185486 A1 | 7/2012 | Voigt |
| 2012/0209832 A1 | 8/2012 | Neystadt |
| 2012/0221581 A1 | 8/2012 | Narayanan |
| 2012/0271829 A1* | 10/2012 | Jason .................. G06F 17/3061 707/740 |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0296920 A1* | 11/2012 | Sahni ...................... H04L 67/22 707/749 |
| 2012/0311034 A1 | 12/2012 | Goldband |
| 2012/0331063 A1 | 12/2012 | Rajaram |
| 2013/0031106 A1 | 1/2013 | Schechter |
| 2013/0041876 A1 | 2/2013 | Dow |
| 2013/0066876 A1 | 3/2013 | Raskino |
| 2013/0086057 A1 | 4/2013 | Harrington |
| 2013/0110823 A1* | 5/2013 | Su ...................... G06F 17/30867 707/723 |
| 2013/0124538 A1 | 5/2013 | Lee |
| 2013/0124542 A1* | 5/2013 | Lee .................. G06F 17/30392 707/751 |
| 2013/0144869 A1* | 6/2013 | Shalabi .................. G06F 17/211 707/722 |
| 2013/0144899 A1 | 6/2013 | Lee |
| 2013/0185106 A1* | 7/2013 | Donatone .............. G06Q 50/01 705/7.14 |
| 2013/0191372 A1 | 7/2013 | Lee |
| 2013/0191416 A1 | 7/2013 | Lee |
| 2013/0198219 A1 | 8/2013 | Cohen |
| 2013/0226918 A1 | 8/2013 | Berkhim |
| 2013/0246404 A1 | 9/2013 | Annau |
| 2013/0298038 A1* | 11/2013 | Spivack ................ H04L 65/403 715/753 |
| 2014/0025734 A1* | 1/2014 | Griffin .................. G06Q 50/01 709/204 |
| 2014/0039876 A1* | 2/2014 | Sayers ................ G06F 17/2775 704/9 |
| 2014/0074608 A1* | 3/2014 | Beck .................. G06Q 30/0273 705/14.54 |
| 2014/0095257 A1* | 4/2014 | Lewis .................. G06Q 30/0202 705/7.31 |
| 2014/0108436 A1* | 4/2014 | Vishria ............. G06F 17/30867 707/754 |
| 2015/0100509 A1* | 4/2015 | Pappas ............. G06F 17/30867 705/319 |
| 2015/0193482 A1* | 7/2015 | Kaushansky ..... G06F 17/30716 707/741 |
| 2016/0080485 A1* | 3/2016 | Hamedi .................. H04L 67/02 709/204 |

* cited by examiner

Trending

- Mike Rowe: TV host responds to criticism of conservatives, GOP with 'unsolicited marketing advice'
- Star Wars: The Force Awakens: Trailer for Episode VII of franchise to debut in theaters Friday
- Marshawn Lynch: After being fined for dodging media, Seahawks player gives 1-word answers in interview
- Batman: Arkham Knight: Video game's new trailer shows Batman;s infiltration of Gotham's Ace Chemicals
- Budweiser Clydesdales: Brewer ditches trademark horses in new ad campaign aimed at millennials
- Jurassic World: Universal welcomes audiences back to 'Jurassic Park' with teaser for new film
- Waka Flocka Flame: Rapper endorses throat drops while surrounded by cloud of smoke in new commercial
- Buffalo, New York: Rising temperatures in aftermath of snowstorms raise concerns of flooding

510

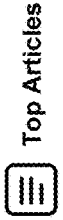

Top Articles

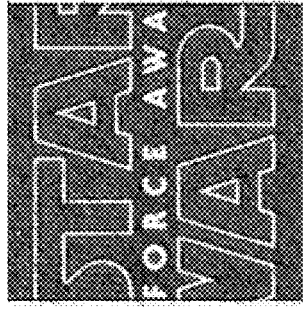

Report: Star Wars Episode VII: The Force Awakens teaser trailer comes next week

The highly anticipated teaser trailer for Star Wars Episode VII: The Force Awakens will release next....

POLYGON.COM      514

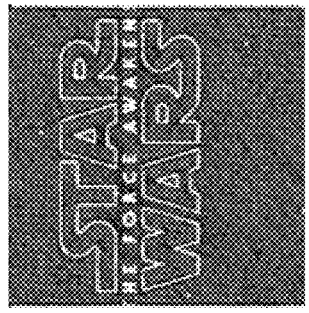

Find Out Where You Can See The 'Star Wars: Force Awakens' Trailer

The first teaser trailer Star Wars: The Force Awakens is coming. Find out where you can see it in theaters.

MTV.COM      514

See More

512A

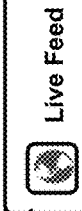

Live Feed

Live Feed

Tony Haung I will wait until someone upload it to YouTube
2 minutes ago · Edited ·
514

Terry O'Neal Geek alert
33 seconds ago ·
514

Alex Chris In case anyone here happens to be living near any of these places. I can wait for the final Hobbit movie (presumably)...
a few seconds ago · Edited ·
514

See More

ComingSoon.net
2 hrs ·

👍 Like Page

The Star Wars: The Force Awakens trailer will debut in select theaters this Friday!

*FIG. 6*

Trending

➤ Mike Rowe: TV host responds to criticism of conservatives, GOP with 'unsolicited marketing advice'

➤ Star Wars: The Force Awakens: Trailer for Episode VII of franchise to debut in theaters Friday ➤ Marshawn Lynch: After being fined for dodging media, Seahawks player gives 1-word answers in interview ➤ Batman: Arkham Knight: Video game's new trailer shows Batman;s infiltration of Gotham's Ace Chemicals ➤ Budweiser Clydesdales: Brewer ditches trademark horses in new ad campaign aimed at millennials ➤ Jurassic World: Universal welcomes audiences back to 'Jurassic Park' with teaser for new film

 Top Articles

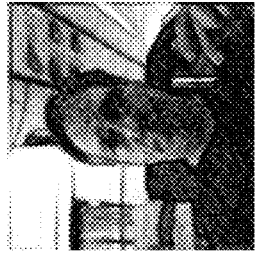 Liberal Challenges Mike Rowe to Explain How a Christian (or Anyone) Could Vote Republican

It may soon become a well-trod adage that when you ask Mike Rowe a snarky, insulting question on his.....

THEBLAZE.COM      514

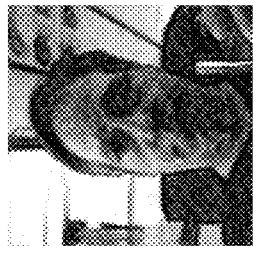 Mike Rowe answers liberal challenge to explain why he votes Republican

As always, Rowe handled this one with tact.

RARE.US      514

See More

*FIG. 9*

702 {  RedState  514  👍 Like Page
Yesterday at 9:00 am · 🌐

704 { Mike Rowe has attracted a cottage industry of leftist Internet trolls who stalk his social media presence and consistently rail at his audacity for not parroting the liberal Hollywood line.

706 {
Mike Rowe Has Some Advice for the Internet

I'm a huge fan of Mike Rowe. Admittedly, not as huge of a fan as my wife (for some reason), but every time I'm flipping through the cable guide and

REDSTATE.COM

Like · Comment · Share · 👍488 💬39 ➤67

AGGREGATING NEWS EVENTS ON ONLINE SOCIAL NETWORKS

TECHNICAL FIELD

This disclosure generally relates to online social networks, and in particular to creating an news object within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks, content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In response to detecting a "trending" topic (e.g., an uptick in activity on a social-networking system that is related to particular people, places, events, or other topics as described below), the social-networking system may create a news-event object corresponding to the trending topic. The trending topic may be an existing topic, a new topic, or may be based on two or more co-trending topics. After the news-event object is created, the news-event object may be "seeded" with an initial post that matches the trending topic. The social-networking system may also generate a tagging-algorithm that may be included with the news-event object. The tagging-algorithm may identify content (e.g., posts) matching the trending topic (e.g., key-voices, n-grams/noun phrases, related topics forming a cluster of topics) as described below. In particular embodiments, links to the identified content may be stored with the news-event object. A search-results page may be generated that includes one or more search-results modules that include the identified content that matches the trending topic that is represented by the news-event object.

BRIEF DESCRIPTION OF THE DRAWINGS

Figure 13:
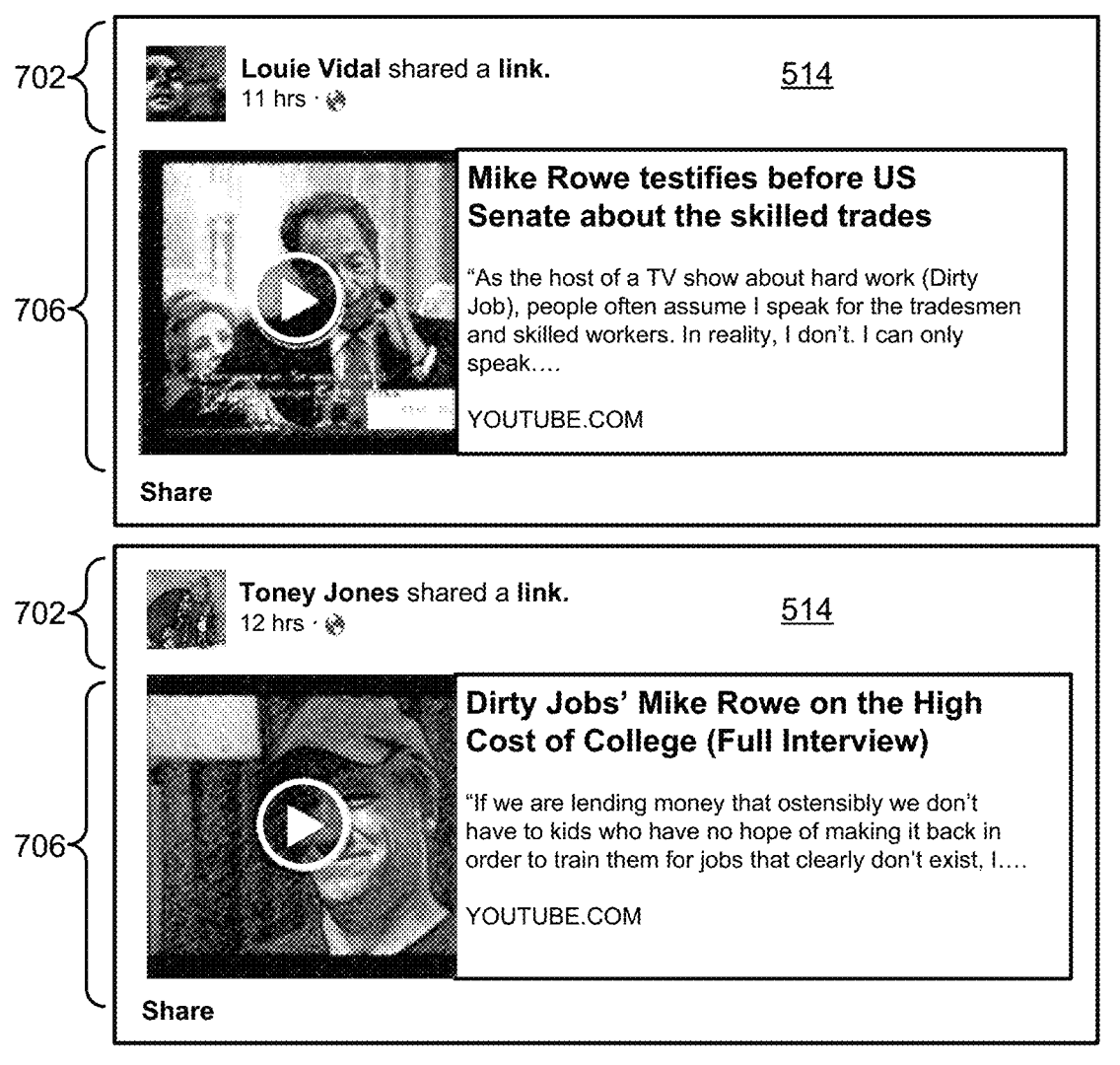

FIGS. 5-13 illustrates illustrate example news event pages and search-results modules.

DESCRIPTION OF EXAMPLE EMBODIMENTS

System Overview

Figure 1:
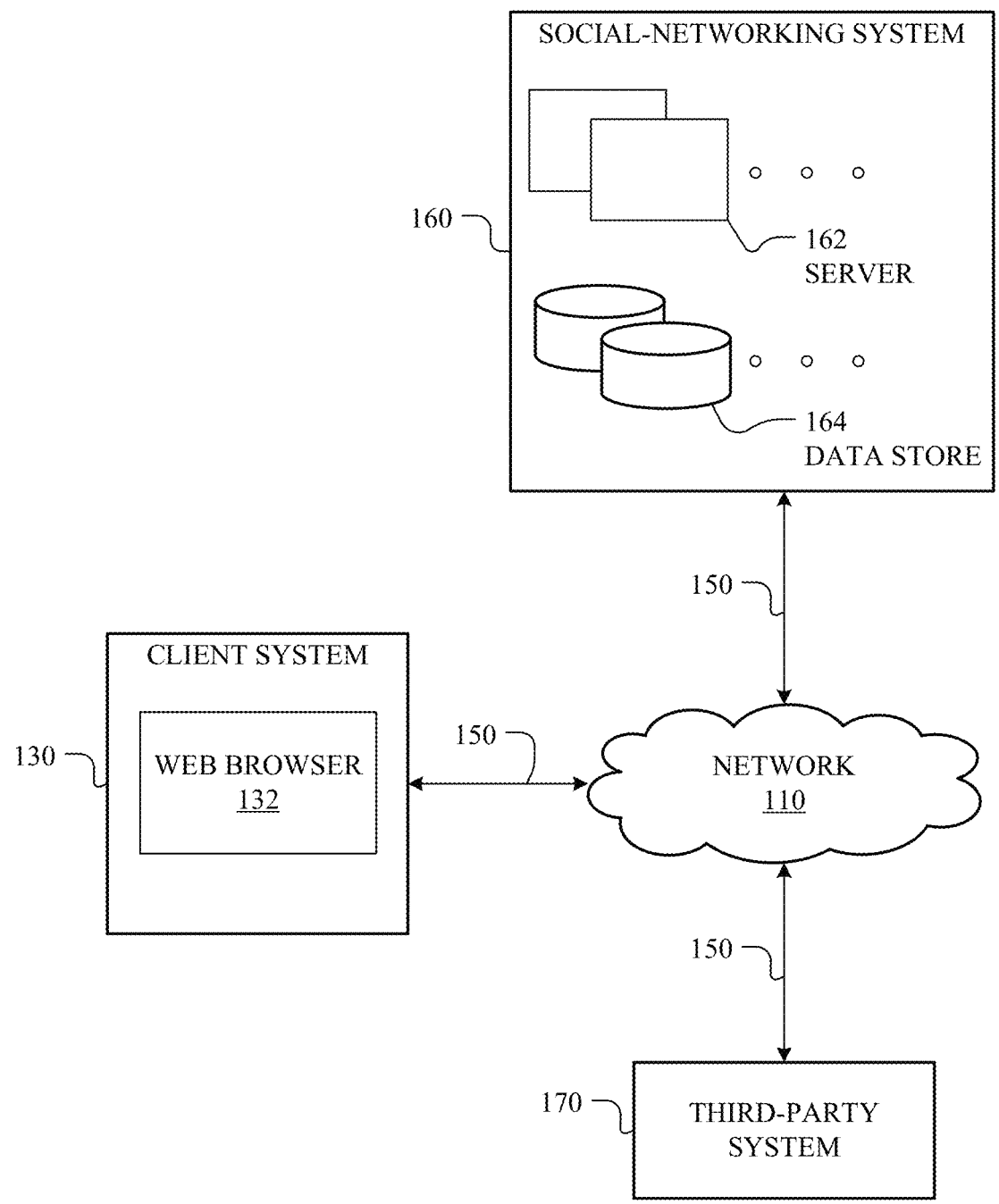
FIG. 1 illustrates an example network environment associated with a social-networking system.

FIG. 1 illustrates an example network environment 100 associated with a social-networking system. Network environment 100 includes client system 130, social-networking system 160, and third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. Client system 130 may enable a network user at client system 130 to access network 110. Client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user of client system 130 may enter a Uniform Resource Locator (URL) or other address directing the web browser 132 to a particular server (such as server 162, or a server associated with third-party system 170), and the web browser 132 may generate a Hyper Text Transfer Protocol (HTTP) request and communicate the HTTP request to the server. The server may accept the HTTP request and communicate with client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server, spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, third-party system 170 may include a third-party content object provider. A third-party content object provider may include one or more sources of content objects, which may be communicated to client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to client system 130. Information may be pushed to client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
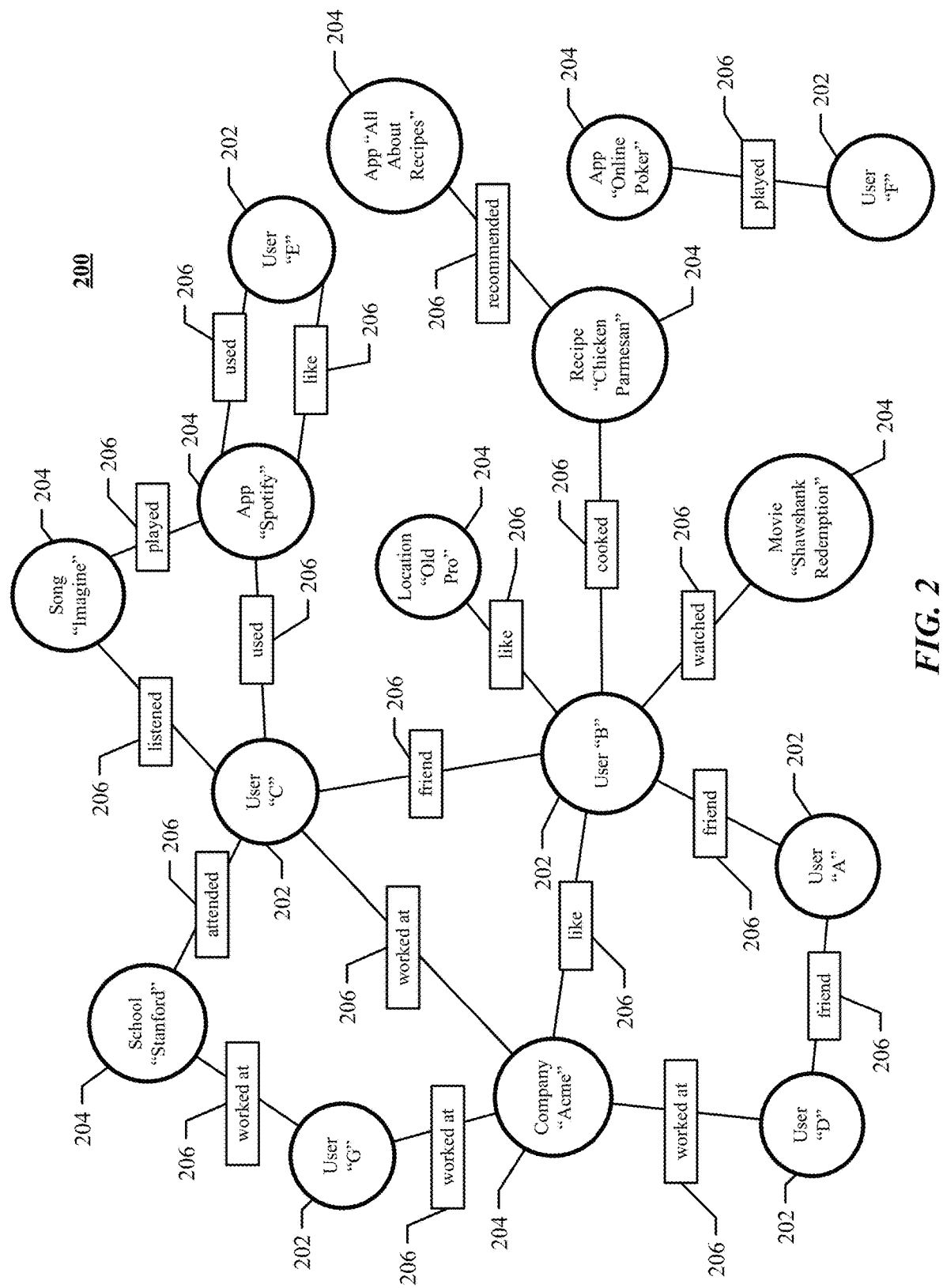
FIG. 2 illustrates an example social graph.

FIG. 2 illustrates an example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-networking system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Indexing Based on Object-Type

Figure 3:
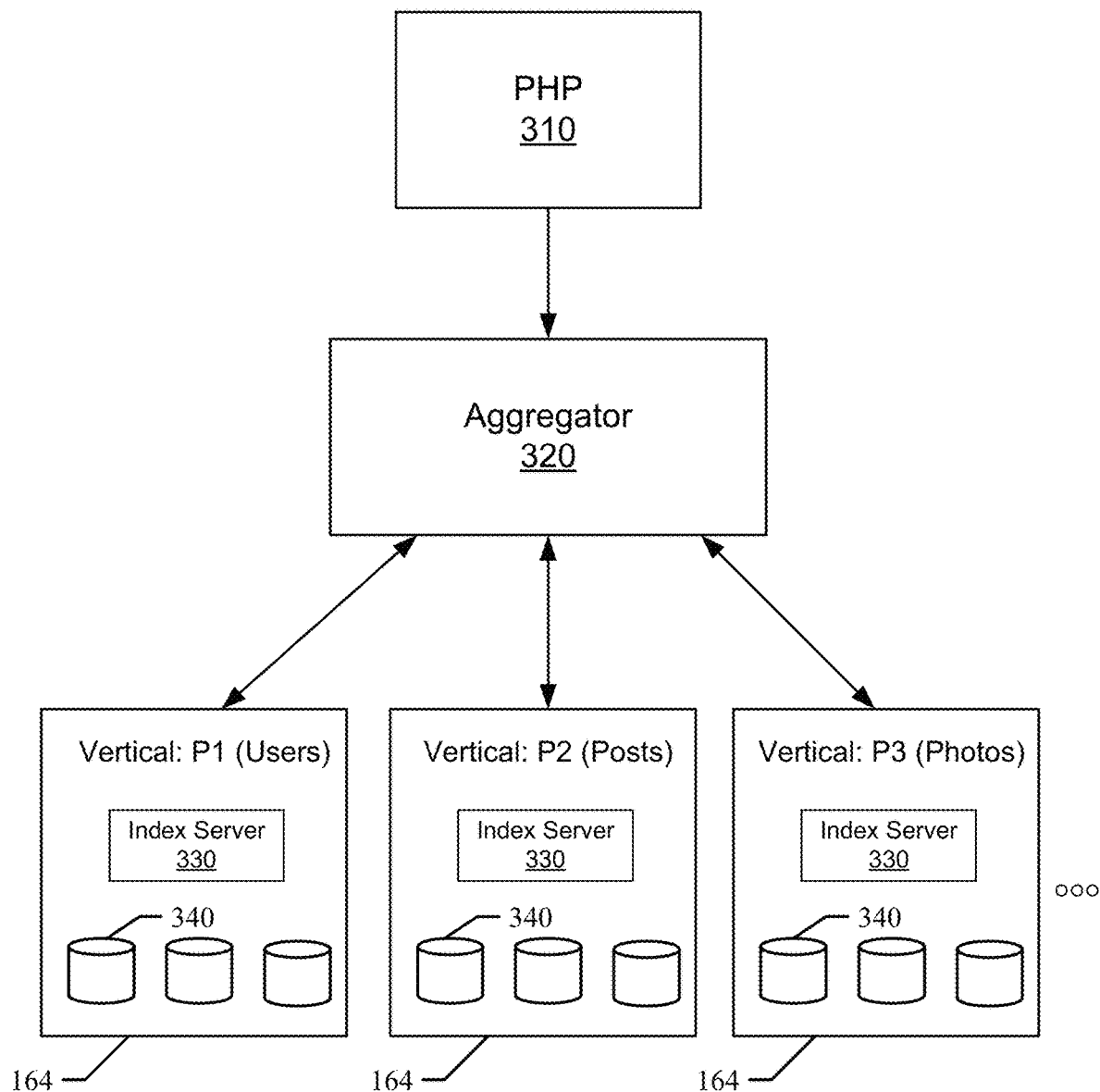
FIG. 3 illustrates an example partitioning for storing objects of a social-networking system.

FIG. 3 illustrates an example partitioning for storing objects of social-networking system 160. A number of data stores 164 (which may also be called "verticals") may store objects of social-networking system 160. The amount of data (e.g., data for a social graph 200) stored in the data stores may be very large. As an example and not by way of limitation, a social graph used by Facebook, Inc. of Menlo Park, Calif. can have a number of nodes in the order of $10^8$, and a number of edges in the order of $10^{10}$. Typically, a large collection of data such as a large database may be divided into a number of partitions. As the index for each partition of a database is smaller than the index for the overall database, the partitioning may improve performance in accessing the database. As the partitions may be distributed over a large number of servers, the partitioning may also improve performance and reliability in accessing the database. Ordinarily, a database may be partitioned by storing rows (or columns) of the database separately. In particular embodiments, a database may be partitioned by based on object-types. Data objects may be stored in a plurality of partitions, each partition holding data objects of a single object-type. In particular embodiments, social-networking system 160 may retrieve search results in response to a search query by submitting the search query to a particular partition storing objects of the same object-type as the search query's expected results. Although this disclosure describes storing objects in a particular manner, this disclosure contemplates storing objects in any suitable manner.

In particular embodiments, each object may correspond to a particular node of a social graph 200. An edge 206 connecting the particular node and another node may indicate a relationship between objects corresponding to these nodes. In addition to storing objects, a particular data store may also store social-graph information relating to the object. Alternatively, social-graph information about particular objects may be stored in a different data store from the objects. Social-networking system 160 may update the search index of the data store based on newly received objects, and relationships associated with the received objects.

In particular embodiments, each data store 164 may be configured to store objects of a particular one of a plurality of object-types in respective data storage devices 340. An object-type may be, for example, a user, a photo, a post, a comment, a message, an event listing, a webpage, an application, a location, a user-profile page, a concept-profile page, a user group, an audio file, a video, an offer/coupon, or other suitable type of object. Although this disclosure describes particular types of objects, this disclosure contemplates any suitable types of objects. As an example and not by way of limitation, a user vertical P1 illustrated in FIG. 3 may store user objects. Each user object stored in the user vertical P1 may comprise an identifier (e.g., a character string), a user name, and a profile picture for a user of the online social network. Social-networking system 160 may also store in the user vertical P1 information associated with a user object such as language, location, education, contact information, interests, relationship status, a list of friends/contacts, a list of family members, privacy settings, and so on. As an example and not by way of limitation, a post vertical P2 illustrated in FIG. 3 may store post objects. Each post object stored in the post vertical P2 may comprise an identifier, a text string for a post posted to social-networking system 160. Social-networking system 160 may also store in the post vertical P2 information associated with a post object such as a time stamp, an author, privacy settings, users who like the post, a count of likes, comments, a count of comments, location, and so on. As an example and not by way of limitation, a photo vertical P3 may store photo objects (or objects of other media types such as video or audio). Each photo object stored in the photo vertical P3 may comprise an identifier and a photo. Social-networking system 160 may also store in the photo vertical P3 information associated with a photo object such as a time stamp, an author, privacy settings, users who are tagged in the photo, users who like the photo, comments, and so on. In particular embodiments, each data store may also be configured to store information associated with each stored object in data storage devices 340.

In particular embodiments, objects stored in each vertical 164 may be indexed by one or more search indices. The search indices may be hosted by respective index server 330 comprising one or more computing devices (e.g., servers). The index server 330 may update the search indices based on data (e.g., a photo and information associated with a photo) submitted to social-networking system 160 by users or other processes of social-networking system 160 (or a third-party system). The index server 330 may also update the search indices periodically (e.g., every 24 hours). The index server 330 may receive a query comprising a search term, and access and retrieve search results from one or more search indices corresponding to the search term. In some embodiments, a vertical corresponding to a particular object-type may comprise a plurality of physical or logical partitions, each comprising respective search indices.

In particular embodiments, social-networking system 160 may receive a search query from a PHP (Hypertext Preprocessor) process 310. The PHP process 310 may comprise one or more computing processes hosted by one or more servers 162 of social-networking system 160. The search query may be a text string or a search query submitted to the PHP process by a user or another process of social-networking system 160 (or third-party system 170). More information on indexes and search queries may be found in U.S. patent application Ser. No. 13/560,212, filed 27 Jul. 2012, U.S. patent application Ser. No. 13/560,901, filed 27 Jul. 2012, and U.S. patent application Ser. No. 13/723,861, filed 21 Dec. 2012, each of which is incorporated by reference.

Search Queries on Online Social Networks

In particular embodiments, a user may submit a query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile pages, external webpages, or any combination thereof. The social-networking system 160 may then generate a search-results page with search results corresponding to the identified content and send the search-results page to the user. The search results may be presented to the user, often in the form of a list of links on the search-results page, each link being associated with a different page that contains some of the identified resources or content. In particular embodiments, each link in the search results may be in the form of a Uniform Resource Locator (URL) that specifies where the corresponding page is located and the mechanism for retrieving it. The social-networking system 160 may then send the search-results page to the web browser 132 on the user's client system 130. The user may then click on the URL links or otherwise select the content from the search-results page to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

News Event Components

Trending Service

Figure 4:
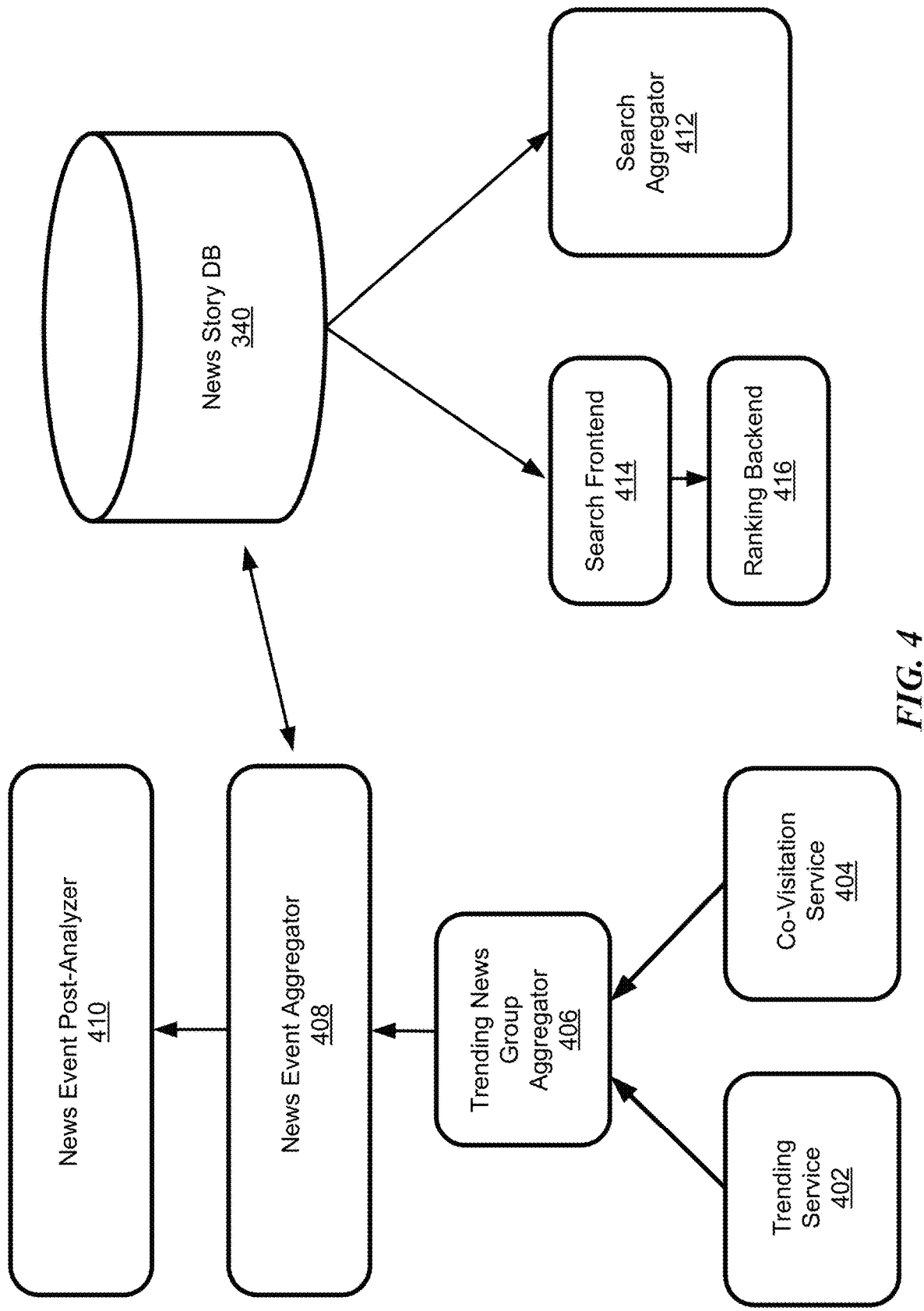
FIG. 4 illustrates example news event modules of a social-network system.

FIG. 4 illustrates example news event components of a social-network system 160. In response to detecting a "trending" topic (e.g., an uptick in activity on social-networking system 160 that is related to particular people, places, events, or other topics as described below), social-networking system 160 may create a news-event object corresponding to the trending topic. As described below, the trending topic may be an existing topic, a new topic, two or more co-trending topics, or a group of topics. After the news-event object is created, the news-event object may be "seeded" with an initial post that matches the trending topic. Social-networking system 160 may also generate a tagging-algorithm that may be included with the news-event object. As an example and not by way of limitation, the tagging-algorithm may be a new algorithm for each news-event object that is generated using data specific to each news-event object. As another example, the tagging-algorithm may be generated by modifying an existing algorithm using data specific to each news-event object. The tagging-algorithm may identify content (e.g., posts) matching the trending topic (e.g., key-voices, n-grams/noun phrases, related topics forming a cluster of topics) as described below. In particular embodiments, links to the identified content may be stored with the news-event object. A search-results page may be generated that includes one or more search-results modules that include the identified content that matches the trending topic that is represented by the news-event object. In particular embodiments, the news event aggregation described below may be performed through analysis of public content stored on social-networking system 160. In particular embodiments, news aggregation components may include a trending service 402, co-visitation service 404, and trending group aggregator 406. Trending service 402 of social-networking system 160 may identify a trending topic based on activity on social-networking system 160. A topic may refer to a title, description, name, or any other suitable descriptor or identifier corresponding to a particular event or subject matter. As an example and not by way of limitation, a topic may refer to any suitable event or any suitable subject matter, such as for example, a news event (e.g., the solidarity march in Paris in January 2015), a political event (e.g., the 2016 United States presidential election), a sporting event (e.g., the 2014 World Cup Tournament), an organization (e.g., the Nobel Peace Prize nominating committee), a place (e.g., Yosemite National Park), a person (e.g., Lionel Messi), a product (e.g., iPhone 6), or a restaurant (e.g., Sancho's Taqueria), or any other type of suitable event or subject matter. In particular embodiments, posts identified by a news-event aggregator 408, described below, may be aggregated into one or more search-results pages that include one or more search-results modules (e.g., top stories, key voices, social posts etc.). Furthermore, presentation of the search-results modules on a search-results page may be "blended" or personalized for a user. In particular embodiments, the search-results modules may be presented on a news event page based on input from a user (e.g., by selecting a trending topic from a Trending Topics menu, selecting the trending topic from a typeahead/keyword query suggestion, or by specifically querying for the topic from a search frontend 414). Posts matching the trending topic may be retrieved from news-story database 340 and ranked by a ranking backend 416. As described below, ranking backend 416 may rank the identified posts based on a variety of factors. Based on the type of search-results modules included in the search-results page, top-scoring/ranking posts for each of the search-results modules may be identified. In particular embodiments, posts matching the trending topic may be identified by news-event aggregator 408 dynamically, or pre-generated using a backend service (e.g., news-event aggregator 408 may update the set of posts that matching the trending topic at pre-determined intervals, such as every 10 minutes. The tagging-algorithm associated with the news-event object may be updated based on new identified posts or newly identified co-trending topics. Although this disclosure described social-networking system 160 having particular news event components performing particular processes, this disclosure contemplates social-networking system 160 having any suitable news event components performing any suitable processes.

In particular embodiments, activity associated with posts stored on social-networking system 160 may be analyzed by trending service 402. One or more topics may be considered "trending" based on detecting an "uptick" or an increase in activity related to particular topics. As an example and not by way of limitation, trending service module 402 may determine a topic is trending based on determining an increase in a number or frequency of posts, likes, mentions, shares on the online social network that are associated with the trending topic or any combination thereof within the pre-determined timeframe. In particular embodiments, an uptick on the activity related to a topic increasing above a pre-determined threshold level (e.g., 200, 2000, or 20000 likes) within a pre-determined period of time (e.g., 30 minutes, 3 hours, or 3 days). As an example and not by way of limitation, trending service module 402 may determine Lionel Messi (a professional football player for FC Barcelona) is a trending topic based on a number of posts about Lionel Messi may reach the pre-determined threshold level over a two-minute period corresponding to Messi scoring a game winning goal during a match. In particular embodiments, the increase in activity may be determined based on a pre-determined percentage increase, e.g., 40 percent, over a baseline level of activity. As an example and not by way of limitation, trending service 402 may determine the 2014 World Cup is a trending topic based on a 200 percent increase in the number of shares of posts related to the 2014 World Cup over a pre-determined period of time.

Co-Visitation Service

In particular embodiments, a co-visitation service 404 may determine one or more co-trending or co-visited topics associated with a trending topic identified by trending service 402. Co-visitation service 404 may identify co-trending topics based on activity performed substantially simultaneously or shortly subsequent to activity of the trending topic, where example activity may include click-thrus, likes, mentions, or shares. As an example and not by way of limitation, a topic, such as for example the San Francisco Giants (a professional baseball team), may experience an uptick in activity, e.g., posts, around the same time as a high amount of activity associated with the 2014 World Series. Co-visitation service 404 may then identify the "San Francisco Giants" as being a co-trending topic with the topic "2014 World Series" based on this uptick in activity around the same time as detecting activity of the 2014 World Series. As another example, a topic corresponding to Vladimir Putin may be identified as co-trending with a topic corresponding to Barack Obama based in part on detecting an uptick in the number of mentions of Vladimir Putin in posts about Barack Obama. As another example, co-visitation service 404 may determine a topic "Janet Yellen" is co-trending with the topic "Federal Reserve Bank" based on users visiting a page or reading a news article about Janet Yellen (the Chairperson of the U.S. Federal Reserve Board) soon after reading a news article about the Federal Reserve Bank. Co-visitation service 404 may identify co-trending topics based on identifying other topics that are mentioned together with trending topic. As an example and not by way of limitation, "Lionel Messi" may be identified as a co-trending topic to trending topic "FC Barcelona" based on both topics being mentioned in a news article. Although this disclosure describes particular methods of identifying particular trending and co-trending topics, this disclosure contemplates any suitable methods of identifying any suitable trending or co-trending topics.

Trending News Group Aggregator and News Event Aggregator

In particular embodiments, one or more trending topics identified by trending service 402 and one or more co-trending topics identified by co-visitation service 404 may be sent to trending news group aggregator 406. Trending news group aggregator 406 may cluster trending or co-trending topics based on a identifying a commonality between topics. As an example and not by way of limitation, trending news group aggregator 406 may identify a cluster of topics that includes trending topic "San Francisco Giants" and co-visited topics "2014 World Series" and "Kauffman Stadium" based on these topics being related since the San Francisco Giants may be playing a World Series game at Kauffman Stadium (a baseball stadium in Kansas City, Mo.). As another example, trending news group aggregator 406 may identify a cluster of topics that includes "Barack Obama" and co-visited topics "2014 G-20 Summit" and "Vladimir Putin" based on these topics being related since the Barack Obama and Vladimir Putin may be attending the 2014 G-20 Summit.

News event aggregator 408 may receive one or more clusters of topics from trending news group aggregator 406 and identify one or more news events based on the clusters of topics. A news event may be an existing topic, a new topic, or a new topic based on two or more co-trending or co-visited topics, or any combination thereof. New topics corresponding to a news event may be identified based on identifying existing topics as being co-trending. As an example and not by way of limitation, news event aggregator 408 may identify the 2014 World Series as a news event based on the cluster of co-trending topics that also includes "San Francisco Giants" and "Kauffman Stadium". As another example, news event aggregator 408 may identify the 2014 G-20 Summit as a news event from the cluster of topics that also includes "Barack Obama" and "Vladimir Putin". In particular embodiments, the cluster of topics received by news event aggregator 408 may be modified to include additional trending topics or remove topics that are no longer trending. Although this disclosure describes particular methods of identifying particular clusters of topics, this disclosure contemplates any suitable methods of identifying any suitable clusters of topics.

News event aggregator 408 may generate a news-event object corresponding to the identified news event. In particular embodiments, the news-event object includes a seed post. In particular embodiments, the seed post may be used as the basis of identifying posts that match the trending topic corresponding to the news event. As an example and not by way of limitation, the tagging-algorithm may perform various analysis of the seed post to identify the matching posts. In particular embodiments, the seed post may be a news article stored in a news story database 340. For example, the seed post of the news-event object corresponding to the topic "2014 World Series" may be a news article analyzing the 2014 World Series generated by the website ESPN.com (a sports news website). In particular embodiments, the news-event object may further include a portion of a tagging-algorithm for identifying posts that match the news event. As an example and not by way of limitation, the portion of the tagging-algorithm may include a portion of executable code used to identify posts that match the news event, one or parameters of the tagging-algorithm (e.g., n-grams, location of the event, time of the event), or any combination thereof. In particular embodiments, the portion of the tagging-algorithm included with the news-event object may include a list of posts identified by the tagging-algorithm executed by news event aggregator 408. Although this disclosure describes particular news-event objects associated with particular news events having particular elements, this disclosure contemplates any suitable news-event objects with associated with any suitable news events having any suitable elements.

1 Textual Information

In particular embodiments, the tagging-algorithm may determine one or more posts associated with one or more topics of the news event by analyzing the text of the seed post. The tagging-algorithm may parse the text of the seed post to identify one or more n-grams, noun phrases, or names. As an example and not by way of limitation, a person may be mentioned in the text of the seed post. As described above, a n-gram is a contiguous sequence of n items from a given sequence of text or speech. The items may be characters, phonemes, syllables, letters, words, base pairs, prefixes, or other identifiable items from the sequence of text or speech. The n-gram may comprise one or more characters of text (letters, numbers, punctuation, etc.). The identified n-grams may form the basis of a search query to identify additional topics related to the news event, as described below.

In particular embodiments, social-networking system 160 may maintain a database of topics, along with a list of keywords, terms, or characters determined to be associated with or the most relevant to each topic. In particular embodiments, topics and keywords associated with the respective topics may be determined, at least in part, by analysis of information in a social-graph database or information extracted and indexed from the social-graph database. As an example and not by way of limitation, social-networking system 160 may identify topics and keywords from analysis of existing social-graph elements, e.g., user nodes 202, concept nodes 204, or edges 206. In particular embodiments, topics and keywords associated with respective topics may be determined, at least in part, by extracting information from one or more third-party systems 170. As an example and not by way of limitation, social-networking system 160 may crawl or scrape an online index, database, or news source (e.g. WIKIPEDIA.org, BBC.com, CNN.com, or NYTIMES.com) to gather topics and associated keywords. In response to receiving a search query corresponding to the n-grams parsed from the text of the seed object, the tagging-algorithm may identify topics associated with the news event by finding a match between characters or words entered as the search query and keywords in a topic database. In particular embodiments, a topic database may include a list of topics with one or more associated keywords for each topic. A topic database may be assembled by social-networking system 160, and periodically, social-networking system 160 may maintain the topic database by adding new topics (e.g., adding a topic for a recent news story), revising existing topics (e.g., updating keywords associated with a particular topic), or removing old or obsolete topics. In particular embodiments, the tagging-algorithm may employ one or more matching algorithms to find a match between a search query and keywords associated with a topic. When a match is found between a search query and a particular topic, social-networking system 160 may associate the search query with that particular topic. In particular embodiments, a search query may be determined to be associated with a single topic. As an example and not by way of limitation, the search query "donkey kong" may be determined to be associated with the video game Donkey Kong. In particular embodiments, a search query may be determined to be associated with two or more topics. As an example and not by way of limitation, the search query "messi barcelona" may be determined to be associated with the topics "Lionel Messi" and "Futbol Club Barcelona." As another example, the tagging-algorithm may identify the topic "Angela Merkel" as a topic associated with the news event "2014 G-20 Summit" by identifying n-grams in the seed post of the news-event object. Although this disclosure describes determining topics associated with search queries in a particular manner, this disclosure contemplates determining a topic associated with a search query in any suitable manner.

In particular embodiments, the tagging-algorithm may identify posts related to the topics using the identified n-grams of the seed object and generating structured search queries based on the identified n-grams. As described above, the structured search query may query a search index of a post vertical P2, as illustrated in the example of FIG. 2, that stores post objects to identify post objects matching the structured search query. In particular embodiments, an identifier, a text string for a post posted to social-networking system 160, of the posts that match the structured search query may be returned to the tagging-algorithm depending on the privacy settings associated with each of the identified posts.

2 Key Voices

Herein, reference to a key-voice may refer to a person who is relevant to, associated with, or knowledgeable about that topic. As an example and not by way of limitation, a key-voice for the topic "Federal Reserve Bank" may be a financial journalist, an employee of the Federal Reserve Bank, or an academic expert in economics or finance. In particular embodiments, the tagging-algorithm may identify one or more key-voices that are associated with a trending or associated topic of the news event. As an example and not by way of limitation, in response to receiving the seed object associated with a particular news event, the tagging-algorithm may identify key-voices who are associated with that particular topic. As an example and not by way of limitation, actor William Shatner (star of the television show Star Trek) may be a key-voice associated with the topic "Star Trek". In particular embodiments, a topic may have multiple key-voices associated with it. As an example and not by way of limitation, each of the members of a rock band may be key-voices associated with the band (e.g., John Lennon, Paul McCartney, George Harrison, and Ringo Starr of the band the Beatles may each be key-voices associated with the topic "the Beatles"). In particular embodiments, a key-voice may be associated with multiple topics. As an example and not by way of limitation, comedian and banjo-player Steve Martin may be a key-voice associated with the topic "comedy," and Steve Martin may also be a key-voice associated with the topic "banjo." In particular embodiments, a key-voice associated with a particular topic may also be a topic. As an example and not by way of limitation, football player Lionel Messi may be a key-voice associated with the topic "Futbol Club Barcelona," and Lionel Messi himself may also be a topic. As another example and not by way of limitation, First Lady Michelle Obama may be a key-voice associated with the topic "Barack Obama," and conversely, President Barack Obama may be a key-voice associated with the topic "Michelle Obama." Although this disclosure describes particular key-voice associated with particular topics, this disclosure contemplates any suitable key-voices associated with any suitable topics.

In particular embodiments, key-voices may include one or more subject-authors, where a subject-author is a person referenced in one or more objects associated with the particular topic. As an example and not by way of limitation, a subject-author may include a person who is directly associated with a particular topic, e.g., their image is included in an object associated with a particular topic. As an example and not by way of limitation, Malala Yousafzai, a 2014 Nobel Peace Prize recipient, may have a photo embedded in news stories about the 2014 Nobel Peace Prize, and so she may be identified as a subject-author associated with the topic "2014 Nobel Peace Prize." As another example, Lionel Messi may be identified as a subject-author associated with the topic "Futbol Club Barcelona," since his name is listed on a team roster of the football club or his picture is included in news stories or articles about Futbol Club Barcelona. In particular embodiments, objects that reference a subject-author may include posts, comments, news stories, articles, photographs, videos, audio files, text files, web pages, books, other suitable object-types, or any suitable combination thereof. As an example and not by way of limitation, the topic "the Beatles" may be associated with various objects (e.g., news stories, articles, or photographs) that include the names of subject-authors John Lennon, Paul McCartney, George Harrison, or Ringo Starr. In particular embodiments, a subject-author may be identified based on a number of objects in which their name or photo appears. As an example and not by way of limitation, social-networking system 160 may identify a person as a subject-author of a particular topic if that person has been mentioned in greater than a threshold number of objects about the topic (e.g., greater than 10, 100, or 1000 posts, comments, news stories, or articles about the topic). Although this disclosure describes particular subject-authors determined in particular manners, this disclosure contemplates any suitable subject-authors determined in any suitable manner.

In particular embodiments, key-voices may include one or more expert-authors. In particular embodiments, an expert-author may be a person recognized as being knowledgeable about, or an expert in, a particular topic. As an example and not by way of limitation, a person who is an expert-author with respect to a particular topic may be a person who frequently authors objects (e.g., posts, comments, news stories, articles, etc.) associated with the topic. As another example, a blogger who writes a blog related to a particular topic may be identified as an expert-author with respect to that topic. In particular embodiments, an expert-author may be a person with a certain threshold level of engagement or an author of greater than a threshold number or threshold frequency of objects associated with the particular topic. As an example and not by way of limitation, social-networking system 160 may identify as an expert-author a person who has authored greater than a threshold number of objects (e.g., greater than 10, 100, or 1000 posts, comments, news stories, or articles, or greater than any suitable number of objects). As another example and not by way of limitation, a person whose objects associated with a particular topic have received greater than a threshold number of feedback from other users (e.g., greater than a threshold number of comments or "likes") may be identified as an expert-author on that topic. As another example, a person who has authored objects on a particular topic with a frequency greater than a threshold frequency (e.g., greater than 1, 2, 3, 5, or 10 objects per week, or greater than any suitable number of objects per week) may be identified as an expert-author. In particular embodiments, an expert-author may be a person identified as an expert by an authoritative source. As an example and not by way of limitation, if a person's name occurs in an online index, database, or news source in connection with a particular topic, then that person may be identified as an expert-author with respect to that topic. In particular embodiments, an expert-author may be a person (e.g., a journalist, reporter, or columnist) who writes for or contributes articles to an authoritative source, where an authoritative source may refer to a publication (e.g., THE WALL STREET JOURNAL or THE NATION), a news network (e.g., CNN or BBC NEWS), or an online news or information source (e.g., SLATE MAGAZINE, CNN.com, or WSJ.com). As an example and not by way of limitation, Walt Mossberg may be identified as an expert-author with respect to various technology topics since he is a journalist who has written numerous articles related to technology for the authoritative source THE WALL STREET JOURNAL. In particular embodiments, an expert-author may not be a subject-author or may not be mentioned in an object associated with a particular topic. As an example and not by way of limitation, although not mentioned directly in an article about the 2014 Nobel Peace Prize, a member of the Nobel Peace Prize nominating committee (who may be determined from a list of committee members on WIKIPEDIA.org, NOBELPEACEPRIZE.org, or any other suitable online index) may be identified as an expert-author with respect to the topic "Nobel Peace Prize." In particular embodiments, a person may be identified as being both a subject-author and an expert-author with respect to a particular topic. As an example and not by way of limitation, Lionel Messi may be identified as a subject-author as well as an expert-author with respect to Futbol Club Barcelona. In particular embodiments, an expert-author may be determined based on multiple criteria. As an example and not by way of limitation, a person may be identified as an expert-author with respect to a particular topic if they have authored greater than a threshold number of objects on the topic and if their objects on the topic have received greater than a threshold number of feedback from other users. As another example, a person may be identified as an expert-author with respect to a particular topic if their name occurs in an online index in connection with the topic, if they have authored greater than a threshold number of objects on the topic, and if the objects they authored have received greater than a threshold number of "likes" from other users. Although this disclosure describes particular expert-authors determined in particular manners, this disclosure contemplates any suitable expert-authors determined in any suitable manner.

As described above, key-voices may include one or more journalists, each journalist being an author of multiple objects associated with a particular topic. As an example and not by way of limitation, a reporter who has written news stories on the Nobel Peace Prize may be identified as a journalist with respect to the topic "2014 Nobel Peace Prize." As another example and not by way of limitation, a journalist who has written greater than a threshold number of news articles on soccer may be identified as a journalist with respect to the topics "Lionel Messi" or "Futbol Club Barcelona." In particular embodiments, a person may be identified as a journalist with respect to multiple topics. As an example and not by way of limitation, a reporter who has authored multiple news stories or magazine articles on the middle east may be identified as a journalist with respect to multiple topics, such as for example, the topics "Iraq," "Syria," "Gaza," or "Israel." In particular embodiments, a person may be identified as being both a journalist and an expert-author with respect to a particular topic. As an example and not by way of limitation, a reporter who authors news stories as well as other objects (e.g., posts, comments, articles, books, or a blog) on a particular topic may be identified as a journalist as well as an expert-author with respect to the topic. In particular embodiments, a person who has authored one or more articles, columns, news stories, or opinion pieces on a particular topic for an authoritative source (e.g., THE WALL STREET JOURNAL, THE NATION, CNN, or BBC NEWS) may be identified as a journalist with respect to the topic. Although this disclosure describes particular journalists determined in particular manners, this disclosure contemplates any suitable journalists determined in any suitable manner.

In particular embodiments, key-voices may include one or more derivative-expert-authors. In particular embodiments, a derivative-expert-author may be a person who is identified as being knowledgeable about a particular topic by the engagement of an expert-author or a subject-author with objects authored by the person. As an example and not by way of limitation, if an identified expert-author on a particular topic frequently engages with objects (e.g., posts, comments, articles) written by another person, then the other person may be identified as a derivative-expert-author. In particular embodiments, a derivative-expert-author may be an author of one or more objects associated with a particular topic, where the objects have received greater than a threshold number of feedback (e.g., comments, replies, or "likes") from one or more expert-authors. As an example and not by way of limitation, if a soccer fan writes one or more posts about Futbol Club Barcelona that receive more than a threshold number of comments from an identified Futbol Club Barcelona expert-author or subject-author, then the fan may be identified as a derivative-expert-author with respect to Futbol Club Barcelona. Although this disclosure describes determining particular derivative-expert-authors in particular manners, this disclosure contemplates determining any suitable derivative-expert-authors in any suitable manner.

In particular embodiments, the tagging-algorithm may identify key-voices, described above, related to the news event and generate search queries that are based on the identified key-voices. As described above, the search queries may query a search index of a post vertical P2, photos vertical P3, or news stores database 340 to identify objects matching the search queries. An identifier of the objects that match the search queries may be returned to the tagging-algorithm depending on the privacy settings associated with each of the identified objects.

3 Eyewitnesses

Social-networking system 160 may determine a location or timeframe of the news event. In particular embodiments, the news event may include objects generated by an eyewitness may be associated with a timeframe and a location of the news event. Herein, reference to an eyewitness may refer to a person who is at the location of a news event during the timeframe when the news event takes place. As an example and not by way of limitation, a person whose location is in proximity to the Maracanã Stadium in Rio de Janeiro, Brazil at a timeframe around 13 Jul. 2014 may be an eyewitness-author for the topic "2014 FIFA World Cup Final". In particular embodiments, social-networking system 160 may determine a timeframe and a location associated with a topic and the tagging-algorithm may identify objects that match the timeframe, location, and topic. A person with one or more posts that match the timeframe, location, and topic criteria may be identified as an eyewitness for the topic. As an example and not by way of limitation, a person who writes one or more posts associated with global climate change and who is located near the United Nations Headquarters at a timeframe around 23 Sep. 2014 may be identified as an eyewitness-author for the topic "UN Climate Summit 2014." As another example, social-networking system 160 may determine that the news event "Hawaii lava flow" has a location near Pahoa, Hi. and a timeframe around November 2014. A person with the same timeframe and location (e.g., a person located near Pahoa, Hi. around November 2014) who has uploaded photos associated with the topic "Hawaii lava flow" may be identified as an eyewitness for the "Hawaii lava flow" news event. Although this disclosure describes particular eyewitness-authors determined in particular manners, this disclosure contemplates any suitable eyewitness-authors determined in any suitable manner.

In particular embodiments, the tagging-algorithm may identify eyewitnesses, as described above, and generate search queries that are based on the identified eyewitnesses. As described above, the search queries may look-up a search index of posts vertical P2 or photo vertical P3 identify photo objects matching the search queries. In particular embodiments, the identifier of the photos that match the structured search query may be returned to the tagging-algorithm. Social-networking system 160 may also store information associated with an object such as an identifier, time stamp, location, author, or privacy settings. An identifier of the objects that match the search queries may be returned to the tagging-algorithm depending on the privacy settings associated with each of the identified objects.

4 Social-Graph Connections

In particular embodiments, news event aggregator 408 may identify key-voices related to the news topic based on connections of a social graph. News event aggregator 408 may access social graph that includes multiple nodes and multiple edges connecting the nodes, each of the edges between two of the nodes representing a single degree of separation between them and each node corresponding to an object associated with the online social network, as illustrated in the example of FIG. 2. In particular embodiments, key-voices may include one or more indirect-subject-authors, each indirect-subject-author being within a threshold degree of separation of a subject-author within the social graph. In particular embodiments, an indirect-subject-author may be a person who is connected to a subject-author within a single degree of separation. As an example and not by way of limitation, 2014 Nobel Peace Prize recipient Malala Yousafzai may be identified as a subject-author associated with the topic "2014 Nobel Peace Prize." Additionally, Malala's father, Ziauddin Yousafzai, may be identified as an indirect-subject-author for the topic "2014 Nobel Peace Prize" since he may be connected to Malala through a first-degree connection within the social graph. As another example, First Lady Michelle Obama may be identified as an indirect-subject-author for a topic for which President Barack Obama is identified as a subject-author. In particular embodiments, an indirect-subject-author may be a person who is associated with or related to a particular topic or to another subject-author. As an example and not by way of limitation, a topic related to soccer player Lionel Messi may identify one or more other players for the Futbol Club Barcelona as indirect-subject-authors, where the other players may be determined from a team roster on an online information source (e.g., the team website, FCBARCELONA.com, or an article about Futbol Club Barcelona on WIKIPEDIA.org). Although this disclosure describes particular indirect-subject-authors determined in particular manners, this disclosure contemplates any suitable indirect-subject-authors determined in any suitable manner.

In particular embodiments, the tagging-algorithm may identify social-graph connections, as described above, and generate search queries that are based on the identified social-graph connections. As described above, the search queries may look-up a search index of posts vertical P2 or photo vertical P3 identify photo objects matching the search queries. In particular embodiments, the identifier of the photos that match the structured search query may be returned to the tagging-algorithm.

Scoring Key-Voices and Objects

In particular embodiments, after identifying one or more key-voices associated with a particular topic, news event aggregator 408 may determine an author-score for each identified key-voice or eyewitness associated with the topic corresponding to the news event. In particular embodiments, the author-score for a key-voice or eyewitness may be based at least in part on a relevance of the key-voice to the topic corresponding to the news event. As an example and not by way of limitation, author-scores for key-voices associated with a particular topic may range from 0 to 100, where an author-score of 0 represents a key-voice with little or minimal relevance to the topic, and an author-score of 100 represents a key-voice with a high or maximum relevance to the topic. In particular embodiments, the author-score for a key-voice associated with a particular topic may be based at least in part on a number of objects associated with the topic that have been authored by the key-voice. As an example and not by way of limitation, a key-voice who has authored more than 20 articles or posts on a particular topic may have a higher score than a key-voice who has authored fewer than 10 articles or posts on the topic. In particular embodiments, the author-score for a key-voice associated with a particular topic may be based at least in part on feedback received by the key-voice or the popularity of the key-voice. As an example and not by way of limitation, a key-voice who has received more than 100 comments or "likes" on articles or posts associated with a particular topic may have a higher author-score than a key-voice who has received fewer than 50 comments or "likes." In particular embodiments, the author-score may be based at least in part on a time or date associated with objects authored by a key-voice. As an example and not by way of limitation, a key-voice who has authored 10 objects within the past week may have a higher score than a key-voice who has authored 10 objects over the past two months. Although this disclosure describes determining particular author-scores based on particular information associated with key-voices, this disclosure contemplates determining any suitable author-scores based on any suitable information associated with key-voices.

In particular embodiments, news event aggregator 408 may determine an object-score for each of the identified objects associated with the topic. In particular embodiments, an object-score may be based at least in part on a relevance of the retrieved object to the particular topic corresponding to the news event. As an example and not by way of limitation, object-scores may range from 0 to 100, where a score of 0 represents an object having little or minimal relevance to the topic, and a score of 100 represents an object with a high or maximum relevance to the topic. As another example, an object-score may be based at least in part on a match between the search query, described above, and the object so that an object with more matches may have a higher object score. As another example and not by way of limitation, an object-score may be based at least in part on feedback received by the object or the popularity of the object (e.g., the number of comments or "likes" received by the object or the number of times the object has been viewed or shared with others). As another example, an object-score may be based at least in part on a time or date associated with the object so that an object posted within the past day may have a higher object-score than an object post two weeks ago. Although this disclosure describes particular object-scores determined in particular manners, this disclosure contemplates any suitable object-scores determined in any suitable manner. More information on identifying and scoring key-voices may be found in U.S. patent application Ser. No. 14/554,190, filed 26 Nov. 2014, which is incorporated by reference.

Retrieving Objects

In particular embodiments, news event aggregator 408 may retrieve one or more of the objects identified by the tagging-algorithm as matching the trending topic. News event aggregator 408 may query the search index of one or more verticals 164 (i.e., data stores) to identify one or more objects stored by the vertical 164 that match the search query corresponding to the identified key-voices or eyewitnesses. News event aggregator 408 may then identify objects (e.g., users, photos, profile pages (or content of profile pages), etc.) that satisfy or otherwise match the query. As an example and not by way of limitation, news event aggregator 408 may retrieve posts stored in the posts vertical P2 corresponding to an identified key-voice of the news event. As another example, news event aggregator 408 may retrieve photos stored in the photos vertical P3 corresponding to an identified location and timeframe of the news event. As another example, news event aggregator 408 may retrieve news articles stored in news story database 340 corresponding to news articles authored by an identified key-voice of the news event.

Retrieving an identified object may include retrieving all of the object (e.g., any text, images, identifier, or other information associated with the object), a portion of the object (e.g., a portion of text associated with the object), an object identifier (object ID) that identifies a particular social-graph element associated with the object, or any combination thereof. In particular embodiments, retrieved objects may include objects associated with a particular topic that are authored by one or more identified key-voices or eye-witness. As an example and not by way of limitation, the retrieved objects may include objects (e.g., posts, comments, articles, videos, or any other suitable content) authored by one or more key-voices, as well as other objects, such as for example, top stories, photos, pages, or posts that are related to the topic. In particular embodiments, each of the objects that are retrieved may have an object-score higher than a pre-determined threshold score or may be authored by a key-voice with an author-score higher than a pre-determined threshold score, as described below. In particular embodiments, news event aggregator 408 may store the news-event object or one or more of the retrieved objects identified by the tagging-algorithm on news-story database 340. Furthermore, the news-event object or one or more of the retrieved objects may be sent a search frontend 414 or ranking backend 416 as part of a typeahead search process, as described below. As another example, the news-event object or one or more of the retrieved objects may be sent to a search aggregator 412.

News Event Post-Processor

In particular embodiments, news event post-analyzer 410 may receive data identifying posts matching the topic corresponding to the news event from news event aggregator 408, as described above. Furthermore, news event post-analyzer 410 may generate one or more search-results modules (hereinafter "modules") that include search results from the search queries based on analysis of the seed post, as described above. Herein, reference to a search-results module may refer to a grouping of objects (e.g. user profiles, posts, photos, webpages, etc.) or references to objects identified in response to a search query. In particular embodiments, the list of search results displayed in the search-results modules may be personalized to a user based on subjects of interest to the user and what is trending across the online social network overall. As an example and not by way of limitation, the objects included in the search-results modules may be based on pages liked by the user, a current location of the user, posts and news events trending across social-networking system 160, or any combination thereof.

As an example and not by way of limitation, the search-results modules may include a key-voices module as well as a top-stories module, a news module, a people module, a photos module, a pages module, or a posts module. In particular embodiments, each search-results module may include one or more references to objects that are organized in a list. A search-results module may include a list of 5, 10, 20, or any suitable number of references to objects. As an example and not by way of limitation, a search-results module associated with the news event "2014 Nobel Peace Prize" may include references to one or more of the following: posts by subject-author Malala Yousafzai, a 2014 Nobel Peace Prize recipient, posts by an indirect-subject-author (e.g., Malala's father, Ziauddin Yousafzai), posts by an expert-author (e.g., a member of the Nobel Peace Prize nominating committee), or a video of an interview with subject-author Malala Yousafzai.

In particular embodiments, each reference in a search-results module may correspond to a retrieved object that has an object score greater than a threshold object score. As an example and not by way of limitation, after determining an object score for retrieved objects authored by key-voices, news event post-analyzer 410 may generate a search-results module that includes references to any suitable number (e.g., 5, 10, or 20) of top-scoring objects. As another example and not by way of limitation, a search-results module may include references to objects having object scores in any suitable top percentile (e.g., object scores in the top 5%, 10%, 20%, or 40% of objects). In particular embodiments, references in a search-results module may be ordered according to the object scores for the respective retrieved objects. As an example and not by way of limitation, a search-results module may include references to ten top-scoring objects, and the references may be arranged in order from highest-scoring object to lowest-scoring object. In particular embodiments, news event post-analyzer 410 may generate multiple search-results modules, where each search-results module corresponds to a particular type of source or key-voice. News event post-analyzer 410 may generate search-results modules associated with one or more of the following types of sources: top stories, key-voices, journalists, social-connections, eyewitnesses, other suitable sources, or any combination thereof. As another example, news event post-analyzer 410 may generate a top articles module (with references to objects associated with the topic with the highest ranked object scores), a key-voices module (with posts by people knowledgeable about the topic, as described above), and an eyewitness-author module (with posts by people whose timeframe and location match that of the topic). Although this disclosure describes generating particular search-results modules in particular manners, this disclosure contemplates generating any suitable search-results modules in any suitable manner.

Search Results Pages

FIGS. 5-13 illustrate example search results pages and search-results modules. Although this disclosure illustrates and describes search results pages of particular news events having particular search-results modules, this disclosure contemplates news event pages of any suitable news event having any suitable search-results modules. As illustrated in the example of FIGS. 5-8, a search results page corresponding to a news event topic "Star Wars: The Force Awakens"

may include one or more search-results modules 512A-B and a trending-topics module 510. As an example and not by way of limitation, a search results page associated with the news event topic "Star Wars: The Force Awakens" may include a trending-topics module 510 with references to topics that are trending, as described above. In particular embodiments, each trending topic of trending-topics module 510 may include a headline that briefly explains why the topic is trending. As an example and not by way of limitation, a user may select a link in trending-topics module 510 corresponding to any of the trending topics of trending-topics module 510 and be presented with a search results page corresponding to the selected trending topic. In particular embodiments, the generation of search-results modules 512A-B is responsive to receiving a selection a link from the client device of the user and a news events page may include 1, 2, 3, 5, 10, or any suitable number of search-results modules 512A-B. As an example and not by way of limitation, a search results page may include one or more key-voices, top articles, live feed, eyewitness, news, people, photos, pages, posts module, or any combination thereof. Furthermore, search-results modules 512A-B may include references 514 to one or more posts, comments, articles, photos, videos, events, applications, web pages, or any combination thereof. In particular embodiments, social-networking system 160 may send, to a client system 130 of a user for display, one or more of the generated search-modules 512. If a user selects (e.g., clicks on or taps) a particular reference from a search-result module, the object associated with that reference may be displayed on the user's client system 130.

In particular embodiments, the search results page corresponding to the news event topic "Star Wars: The Force Awakens" may include a search-results module ("Top Articles") 512A. As an example and not by way of limitation, search-results module 512A may provide references 514 to objects associated with the topic with the highest ranked object scores, described above. As another example, search-results module 512A may provide references 514 to objects associated with the topic having the highest affinity, described below, between the user and the author. References 514 to objects in search-results module 512A may include a thumbnail photo, content of the object, or a time or date associated with the referenced object. In particular embodiments, search-results module 512A may include references 514 to one or more of retrieved objects associated with a particular topic that are authored by an identified key-voice.

The search results page corresponding to the trending topic "2014 Star Wars: The Force Awakens" may include a search-results module 512B ("Live Feed"), as illustrated in the example of FIGS. 5-6. In particular embodiments, search-results module 512B may reference objects 514 recently authored by users of social-networking system 160 that are relevant to the trending topic "Star Wars: The Force Awakens", as illustrated in the example of FIG. 6. In particular embodiments, search-results modules 512A-B may include one or more references to the posts that are most relevant to the trending topic and authored by other users with a social connection to the user. As another example, search-results module 512B may provide references 514 to objects posted or authored by other users of social-networking system 160 having the highest affinity, described below, with the user. In particular embodiments, references 514 to objects of search-results module 512B may be updated as objects matching the topic are posted to social-networking system 160.

Figure 7:
Figure 8:
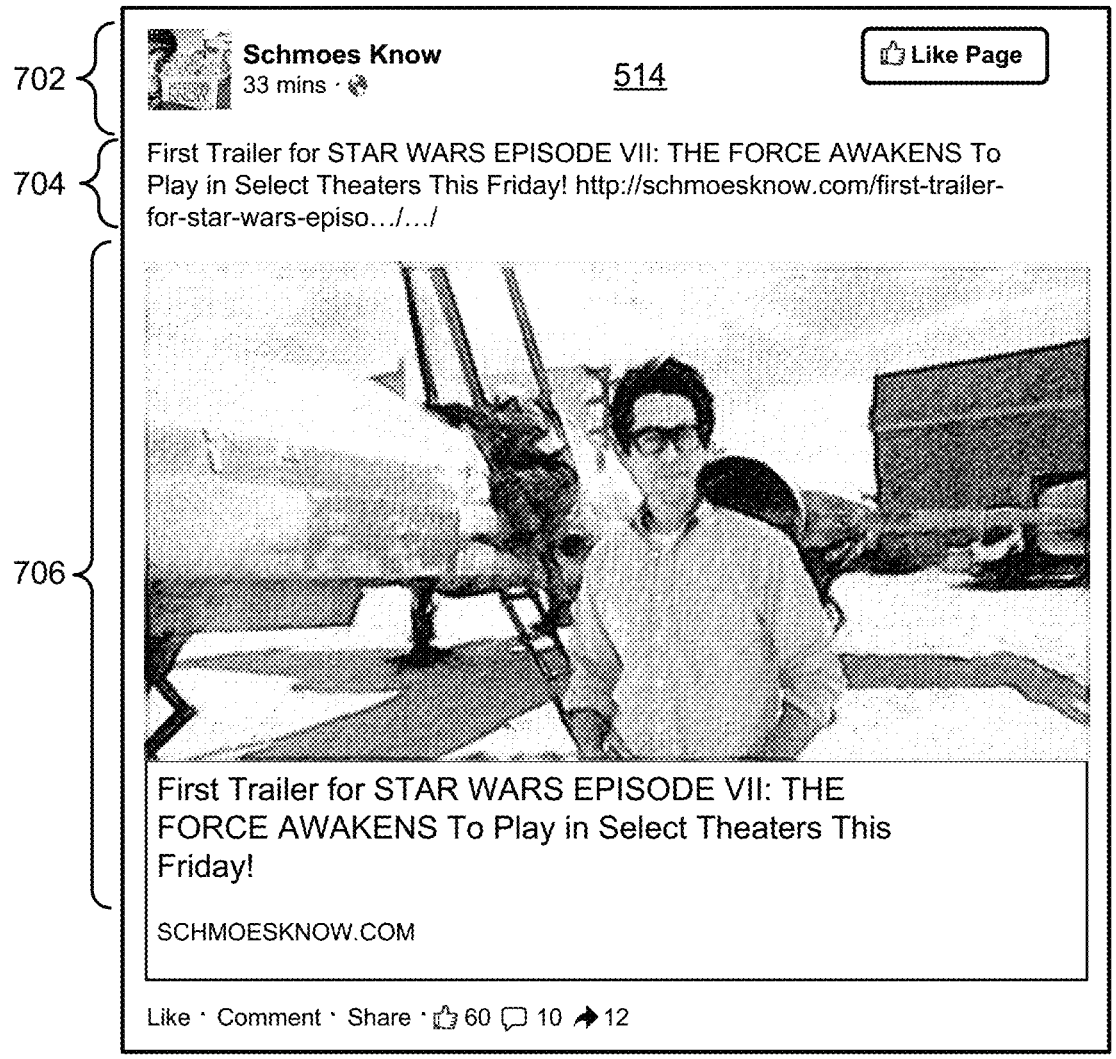

In particular embodiments, a search-results module may include a reference 514 to an object matching the topic authored by an identified key-voice. As illustrated by the example of FIGS. 7-8, the websites NERDIST or SCHMOES KNOWS, respectively, each may be identified as a key-voice for topic "Star Wars: The Force Awakens" based on being an authoritative source in regard to science-fiction movies. Reference 514 may include an indicator 702 of the key-voice, a headline 704, or content 706 that may include a photo or a portion of the text of the object. As an example and not by way of limitation, content 706 may include one or more pieces of information used to provide a brief summary or overview of the object.

As illustrated in the example of FIGS. 9-13, a search results page corresponding to a news event topic "Mike Rowe" may include search-results module 512A and a trending-topics module 510. A search results page associated with the topic "Mike Rowe" may include a trending-topics module 510, described above, with references to trending topics. Each trending topic may include a headline that briefly explains why the topic is trending. As described above, a user may select a link in trending-topics module 510 corresponding to any of the trending topics of trending topics module 510 and be presented with a search results page corresponding to the selected trending topic.

As an example and not by way of limitation, the search results page corresponding to the news event topic "Mike Rowe" the search-results module 512A may be a top-articles module. In particular embodiments, search-results module 512A may provide references 514 to objects associated with the topic with the highest ranked object-scores, author-scores, affinity, or any combination thereof, as described above. References 514 to objects in search-results module 512A may include a thumbnail photo, content of the object, or a time or date associated with the referenced object. In particular embodiments, search-results module 512A may include references 514 to one or more of retrieved objects associated with a particular topic that are authored by an identified key-voice.

Figure 10:

The search results page corresponding to the trending topic "Mike Rowe" may include a search-results module 512B ("Live Feed"), illustrated in the example of FIG. 10. In particular embodiments, search-results module 512B may reference 514 objects recently authored by users of social-networking system 160 that are relevant to the trending topic "Mike Rowe". In particular embodiments, references 514 to objects may be listed in an order based on the recency of each reference 514. As an example, reference 514 to the object most recently posted on social-networking system 160 may be positioned at the top of the list of references 514 of search-results module 512B and the remaining references 514 listed in descending order with the least recent reference 514 being at the bottom of the list. As another example, search-results module 512B may provide references 514 to objects posted or authored by other users of social-networking system 160 having the highest affinity with the user. In particular embodiments, additional references 514 of search-results module 512B may be displayed in response to a user selecting one or more icons 1002 of search-results module 512.

Figure 12:
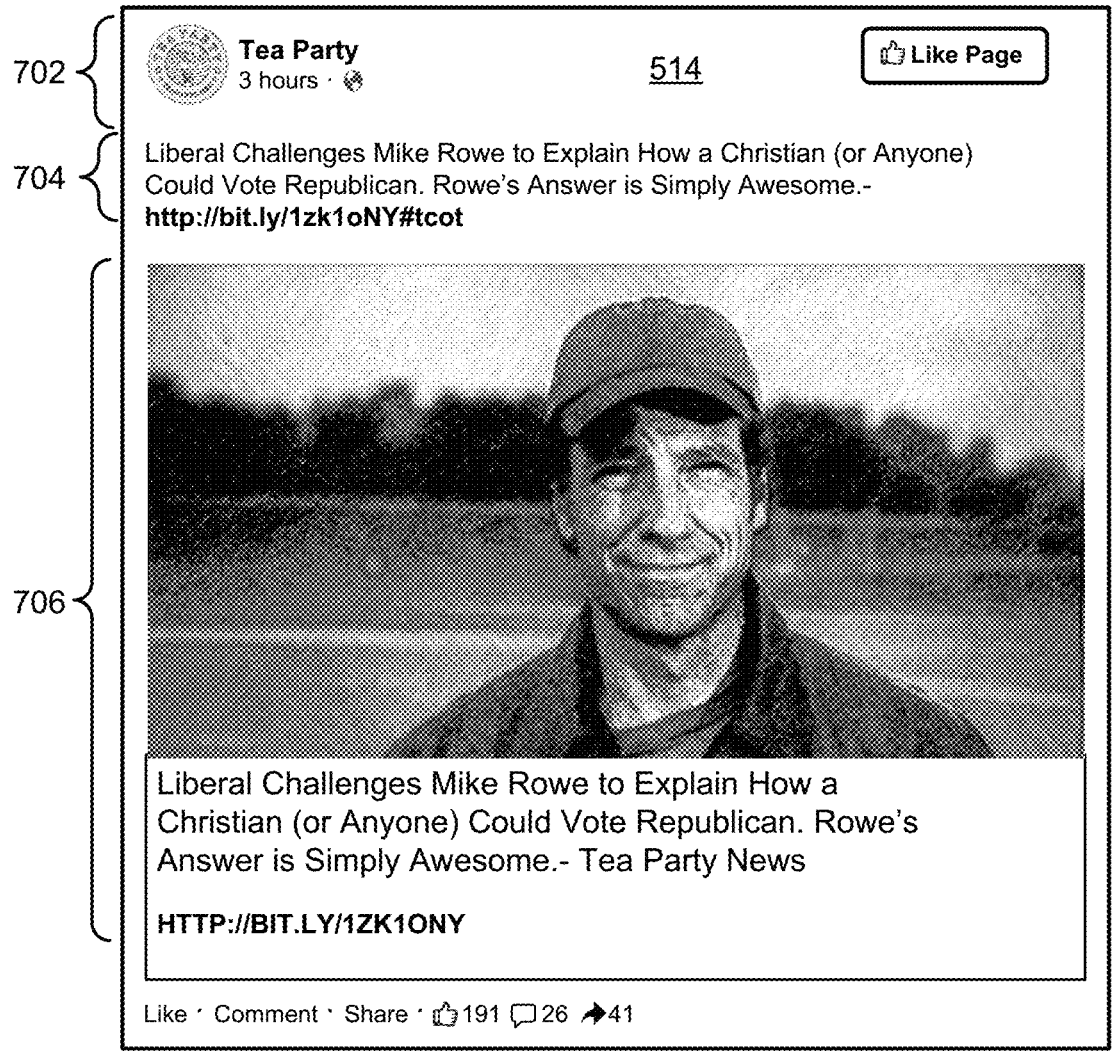

As described above, a search-results module may include a reference 514 to an object matching the topic authored by an identified key-voice. As illustrated by the example of FIGS. 11-12, the websites REDSTATE.COM or TEAPARTY.ORG, respectively, each may be identified as a key-voice for topic "Mike Rowe" based on being an authoritative source in regard to conservative politics. Reference 514 may include an indicator 702 of the key-voice, a headline 704, or content 706 that may include a photo or a portion of the text of the object.

As described above, a search-results module may include a reference 514 to an object matching the topic authored by an identified key-voice. As illustrated by the example of FIGS. 11-12, the websites REDSTATE.COM or TEAPARTY.ORG, respectively, each may be identified as a key-voice for topic "Mike Rowe" based on being an authoritative source in regard to conservative politics. Reference 514 may include an indicator 702 of the key-voice, a headline 704, or content 706 that may include a photo or a portion of the text of the object.

Figure 14:
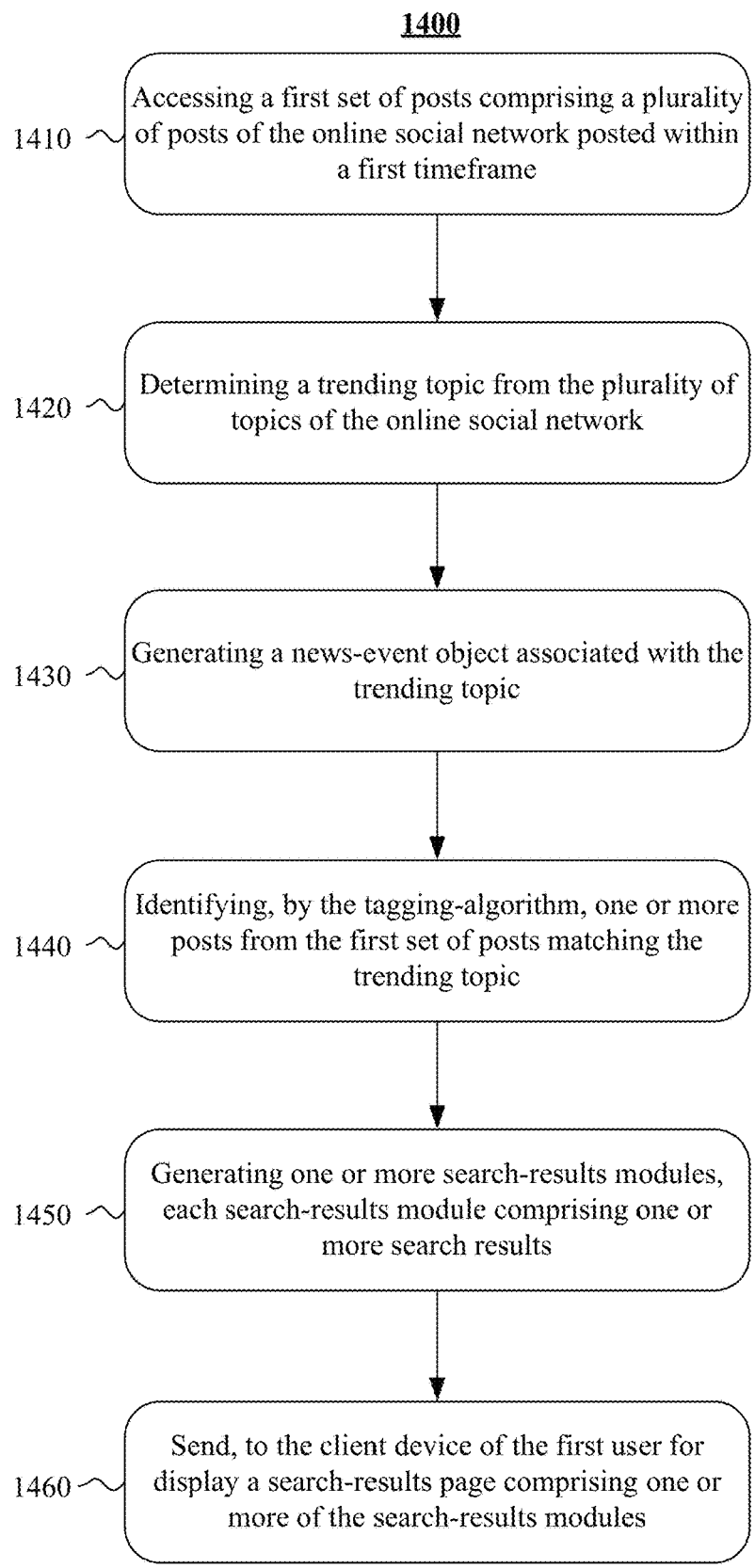
FIG. 14 illustrates an example method for generating a search-results page on online social networks.

As described above, a search-results module may include a reference 514 to an object matching the topic that is posted by other users of social-networking system 160. As illustrated by the example of FIG. 14, users of social-networking system 160 may share a reference 514 to an object matching the topic "Mike Rowe". Reference 514 may include an indicator 702 of the user or content 706 that may include a link to a video or a portion of the text of the object. In particular embodiments, references 514 of objects posted by other users of social-networking system 160 may be identified based on the affinity, described below, between the user and the other users social-networking system 160, recency of the posts, object-score of the post, or any combination thereof.

Blending Search-Results

As described above, the news event post-processor may generate one or more search-result modules 512A-B with references 514 to related objects and interleave or "blend" references 514 into search-results modules 512A-B. In particular embodiments, search-results modules 512A-B may be blended into the corresponding news events page. Furthermore, one or more search-results modules 512A-B may be scored based at least in part on an object-type associated with search-results modules 512A-B and/or by determining a classification of the search query. Identification of the objects that make up each search-results module 512A-B may be personalized for each user. As an example and not by way of limitation, identification of objects may be based on the object-score, author-score, recency, affinity, social-graph information, or any combination thereof. As another example, search-results modules 512A-B may be provided to the user based on an author-score, object-score, affinity, or any combination thereof. Although this disclosure describes generating and blending objects or search-results modules in a particular manner, this disclosure contemplates generating and blending objects or search-results modules in any suitable manner.

FIG. 14 illustrates an example method 1400 for generating a search-results page on online social networks. The method may begin at step 1410, where computing devices of social-networking system 160 may access a first set of posts that includes a number of posts of the social-networking system 160 posted within a first timeframe. In particular embodiments, each post is associated with one or more topics of a number of topics of social networking system 160. At step 1420, computing devices of social-networking system 160 may determine a trending topic from the number of topics of social networking system 160. At step 1430, computing devices of social-networking system 160 may generate a news-event object associated with the trending topic. In particular embodiments, the news-event object includes a seed post from the first set of posts and a tagging-algorithm for identifying posts matching the trending topic. At step 1440, computing devices of social-networking system 160 may identify, by the tagging-algorithm, one or more posts from the first set of posts that match the trending topic. At step 1450, computing devices of social-networking system 160 may generate one or more search-results modules. In particular embodiments, each of the search-results modules may include one or more search results. Furthermore, each search result may include a reference to an identified post that matches the trending topic. At step 1460, computing devices of social-networking system 160 may send, to the client device of the user for display, a search-results page that includes one or more of the search-results modules, at which point the method may end. Particular embodiments may repeat one or more steps of method 1400 of FIG. 14, where appropriate. Although this disclosure describes and illustrates particular steps of the method of FIG. 14 as occurring in a particular order, this disclosure contemplates any suitable steps of the method of FIG. 14 occurring in any suitable order. Moreover, although this disclosure describes and illustrates an example method for searching for content by key-authors on online social networks, including the particular steps of the method of FIG. 14, this disclosure contemplates any suitable method for searching for content by key-authors on online social networks including any suitable steps, which may include all, some, or none of the steps of the method of FIG. 14, where appropriate. Furthermore, although this disclosure describes and illustrates particular components, devices, or systems carrying out particular steps of the method of FIG. 14, this disclosure contemplates any suitable combination of any suitable components, devices, or systems carrying out any suitable steps of the method of FIG. 14.

Typeahead Processes and Search Queries

Figure 15:
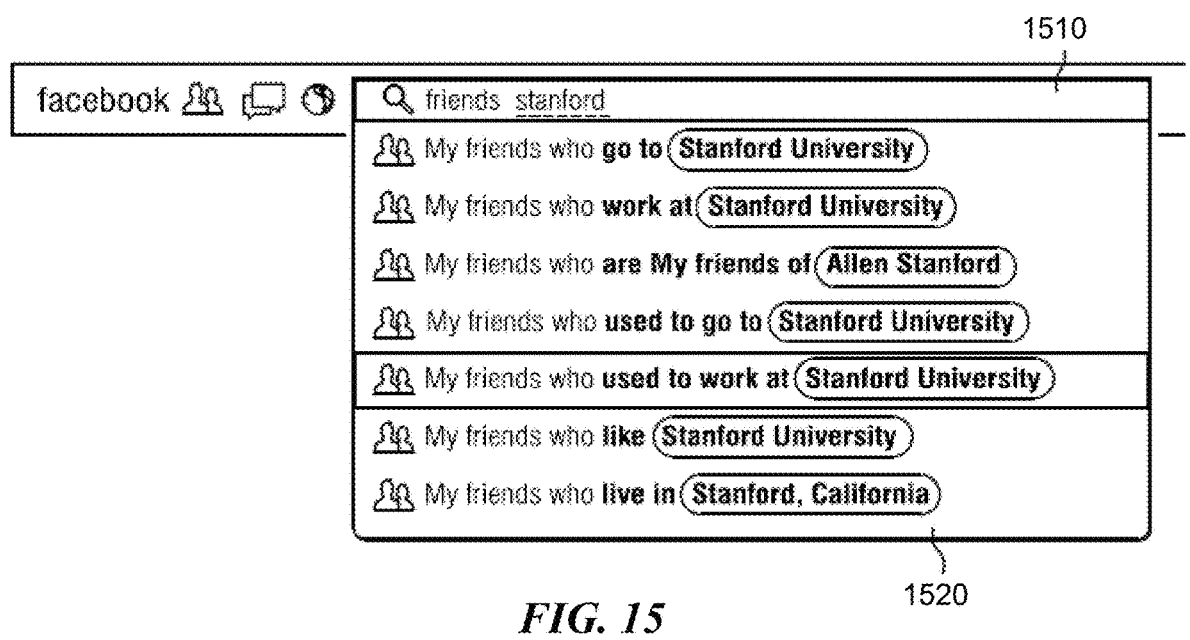
FIG. 15 illustrates an example search query on a user interface (UI).

FIG. 15 illustrates an example search query on a user interface (UI). As an example and not by way of limitation, a user may enter a text query "friends stanford" into a query field 1510 of a UI. As the user enters this text query into query field 1510, social-networking system 160 may provide various suggested structured queries, as illustrated in drop-down menu 1520. These structured queries may be presented to the user, who can then select among the structured queries to indicate that the selected structured query should be run by social-networking system 160. By providing suggested structured queries in response to a user's text query, social-networking system 160 may provide a powerful way for users of the online social network to search for elements represented in the social graph 200 based on their social-graph attributes and their relation to various social-graph elements. In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested webpage (such as, for example, a user-profile page, a concept-profile page, a search-results webpage, or another suitable page of the online social network), which may be hosted by or accessible in social-networking system 160. As illustrated in the example of FIG. 4, the typeahead process may work in conjunction with one or more search frontend 414 (client-side) and/or search backend 416 (server-side) typeahead processes (hereinafter referred to simply as "typeahead process") executing at (or within) social-networking system 160 (e.g., within servers 162), to interactively and virtually instantaneously (as appearing to the user) attempt to auto-populate the form with a term or terms corresponding to names of existing social-graph elements, or terms associated with existing social-graph elements, determined to be the most relevant or best match to the characters of text entered by the user as the user enters the characters of text into query field 1510. As an example and not by way of limitation, the typeahead feature may automatically populate the form with a reference to a news-event object or objects (such as, for example, the node name/type, node ID, edge name/type, edge ID, or other suitable reference or identifier) associated with the news-event object. In particular embodiments, the typeahead processes, in conjunction with the information from the social-graph database, as well as potentially in conjunction with various others processes, applications, or databases located within or executing within social-networking system 160, may be able to predict a user's intended declaration with a high degree of precision. More information on typeahead processes may be found in U.S. patent application Ser. No. 12/763,162, filed 19 Apr. 2010, and U.S. patent application Ser. No. 13/556,072, filed 23 Jul. 2012, each of which is incorporated by reference.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 16:
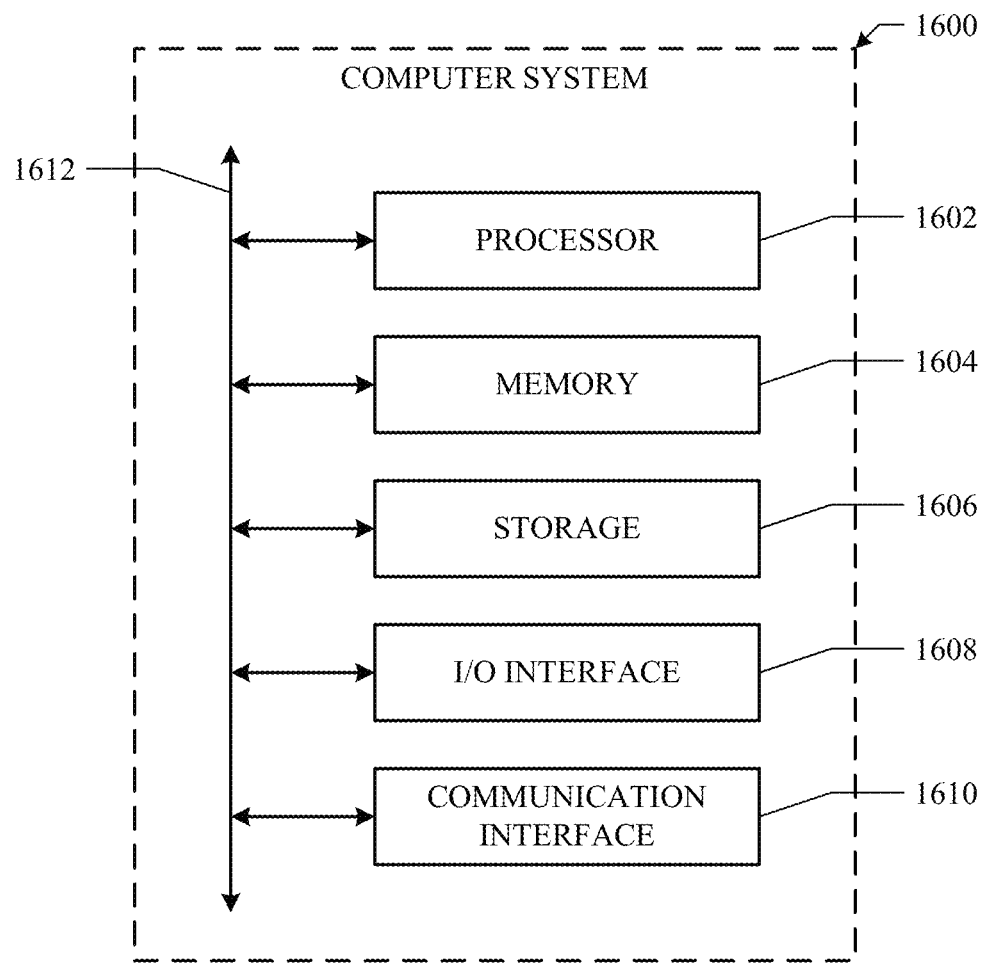
FIG. 16 illustrates an example computer system.

FIG. 16 illustrates an example computer system 1600. In particular embodiments, one or more computer systems 1600 perform one or more steps of one or more methods described or illustrated herein. In particular embodiments, one or more computer systems 1600 provide functionality described or illustrated herein. In particular embodiments, software running on one or more computer systems 1600 performs one or more steps of one or more methods described or illustrated herein or provides functionality described or illustrated herein. Particular embodiments include one or more portions of one or more computer systems 1600. Herein, reference to a computer system may encompass a computing device, and vice versa, where appropriate. Moreover, reference to a computer system may encompass one or more computer systems, where appropriate.

This disclosure contemplates any suitable number of computer systems 1600. This disclosure contemplates computer system 1600 taking any suitable physical form. As example and not by way of limitation, computer system 1600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1600 may include one or more computer systems 1600; be unitary or distributed; span multiple locations; span multiple machines; span multiple data centers; or reside in a cloud, which may include one or more cloud components in one or more networks. Where appropriate, one or more computer systems 1600 may perform without substantial spatial or temporal limitation one or more steps of one or more methods described or illustrated herein. As an example and not by way of limitation, one or more computer systems 1600 may perform in real time or in batch mode one or more steps of one or more methods described or illustrated herein. One or more computer systems 1600 may perform at different times or at different locations one or more steps of one or more methods described or illustrated herein, where appropriate.

In particular embodiments, computer system 1600 includes a processor 1602, memory 1604, storage 1606, an input/output (I/O) interface 1608, a communication interface 1610, and a bus 1612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1602 includes hardware for executing instructions, such as those making up a computer program. As an example and not by way of limitation, to execute instructions, processor 1602 may retrieve (or fetch) the instructions from an internal register, an internal cache, memory 1604, or storage 1606; decode and execute them; and then write one or more results to an internal register, an internal cache, memory 1604, or storage 1606. In particular embodiments, processor 1602 may include one or more internal caches for data, instructions, or addresses. This disclosure contemplates processor 1602 including any suitable number of any suitable internal caches, where appropriate. As an example and not by way of limitation, processor 1602 may include one or more instruction caches, one or more data caches, and one or more translation lookaside buffers (TLBs). Instructions in the instruction caches may be copies of instructions in memory 1604 or storage 1606, and the instruction caches may speed up retrieval of those instructions by processor 1602. Data in the data caches may be copies of data in memory 1604 or storage 1606 for instructions executing at processor 1602 to operate on; the results of previous instructions executed at processor 1602 for access by subsequent instructions executing at processor 1602 or for writing to memory 1604 or storage 1606; or other suitable data. The data caches may speed up read or write operations by processor 1602. The TLBs may speed up virtual-address translation for processor 1602. In particular embodiments, processor 1602 may include one or more internal registers for data, instructions, or addresses. This disclosure contemplates processor 1602 including any suitable number of any suitable internal registers, where appropriate. Where appropriate, processor 1602 may include one or more arithmetic logic units (ALUs); be a multi-core processor; or include one or more processors 1602. Although this disclosure describes and illustrates a particular processor, this disclosure contemplates any suitable processor.

In particular embodiments, memory 1604 includes main memory for storing instructions for processor 1602 to execute or data for processor 1602 to operate on. As an example and not by way of limitation, computer system 1600 may load instructions from storage 1606 or another source (such as, for example, another computer system 1600) to memory 1604. Processor 1602 may then load the instructions from memory 1604 to an internal register or internal cache. To execute the instructions, processor 1602 may retrieve the instructions from the internal register or internal cache and decode them. During or after execution of the instructions, processor 1602 may write one or more results (which may be intermediate or final results) to the internal register or internal cache. Processor 1602 may then write one or more of those results to memory 1604. In particular embodiments, processor 1602 executes only instructions in one or more internal registers or internal caches or in memory 1604 (as opposed to storage 1606 or elsewhere) and operates only on data in one or more internal registers or internal caches or in memory 1604 (as opposed to storage 1606 or elsewhere). One or more memory buses (which may each include an address bus and a data bus) may couple processor 1602 to memory 1604. Bus 1612 may include one or more memory buses, as described below. In particular embodiments, one or more memory management units (MMUs) reside between processor 1602 and memory 1604 and facilitate accesses to memory 1604 requested by processor 1602. In particular embodiments, memory 1604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1604 may include one or more memories 1604, where appropriate. Although this disclosure describes and illustrates particular memory, this disclosure contemplates any suitable memory.

In particular embodiments, storage 1606 includes mass storage for data or instructions. As an example and not by way of limitation, storage 1606 may include a hard disk drive (HDD), a floppy disk drive, flash memory, an optical disc, a magneto-optical disc, magnetic tape, or a Universal Serial Bus (USB) drive or a combination of two or more of these. Storage 1606 may include removable or non-removable (or fixed) media, where appropriate. Storage 1606 may be internal or external to computer system 1600, where appropriate. In particular embodiments, storage 1606 is non-volatile, solid-state memory. In particular embodiments, storage 1606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1606 taking any suitable physical form. Storage 1606 may include one or more storage control units facilitating communication between processor 1602 and storage 1606, where appropriate. Where appropriate, storage 1606 may include one or more storages 1606. Although this disclosure describes and illustrates particular storage, this disclosure contemplates any suitable storage.

In particular embodiments, I/O interface 1608 includes hardware, software, or both, providing one or more interfaces for communication between computer system 1600 and one or more I/O devices. Computer system 1600 may include one or more of these I/O devices, where appropriate. One or more of these I/O devices may enable communication between a person and computer system 1600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1608 for them. Where appropriate, I/O interface 1608 may include one or more device or software drivers enabling processor 1602 to drive one or more of these I/O devices. I/O interface 1608 may include one or more I/O interfaces 1608, where appropriate. Although this disclosure describes and illustrates a particular I/O interface, this disclosure contemplates any suitable I/O interface.

In particular embodiments, communication interface 1610 includes hardware, software, or both providing one or more interfaces for communication (such as, for example, packet-based communication) between computer system 1600 and one or more other computer systems 1600 or one or more networks. As an example and not by way of limitation, communication interface 1610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1610 for it. As an example and not by way of limitation, computer system 1600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1600 may include any suitable communication interface 1610 for any of these networks, where appropriate. Communication interface 1610 may include one or more communication interfaces 1610, where appropriate. Although this disclosure describes and illustrates a particular communication interface, this disclosure contemplates any suitable communication interface.

In particular embodiments, bus 1612 includes hardware, software, or both coupling components of computer system 1600 to each other. As an example and not by way of limitation, bus 1612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1612 may include one or more buses 1612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices of an online social network:
accessing, by a trending service component of the online social network, a first set of posts comprising a plurality of posts of the online social network posted within a first timeframe, each post being associated with one or more topics of a plurality of topics of the online social network;
determining, by the trending service component, a trending topic from the plurality of topics of the online social network;
generating, by a news event aggregator component of the online social network, a news-event object associated with the trending topic, the news-event object comprising a seed post from the first set of posts and executable instructions for a tagging-algorithm for identifying posts matching the trending topic, wherein the tagging-algorithm comprises one or more parameters corresponding to the trending topic associated with the news-event object, and wherein the parameters comprise one or more of:
an n-gram associated with the trending topic,
an entity associated with the trending topic,
a topic co-trending with the trending topic
a time of an event associated with the trending topic, or
a location of an event associated with the trending topic;
identifying, by executing the instructions of the tagging-algorithm by the news event aggregator component, one or more posts from the first set of posts that match the trending topic by:
generating a search query associated with the trending topic,
identifying one or more posts from the first set of posts that match one or more of the parameters,
scoring the identified posts based on one or more of the parameters, and
selecting one or more of the posts having scores greater than a pre-determined threshold score;
generating, by a news event post-analyzer, a plurality of search-results modules, each search-results module comprising a plurality of search results, each search result comprising a reference to an identified post that matches the trending topic; and
sending, to a client device of a user from a search frontend of the online social network, instructions for presenting a search-results page comprising the search-results modules.

2. The method of claim 1, wherein determining the trending topic from the plurality of topics is based on an increase in a number or frequency of posts, likes, mentions, or shares on the online social network that are associated with the trending topic within a second timeframe.

3. The method of claim 1, wherein generating the news-event object comprises generating the tagging-algorithm by:
parsing a content of the seed post into one or more n-grams; and
determining one or more key topics based on one or more of the n-grams that match names of entities associated with the online social network.

4. The method of claim 1, wherein generating the news-event object comprises generating the tagging-algorithm by determining one or more co-visited topics based on identifying one or more topics having activity subsequent to activity associated with the trending topic within a second timeframe associated with the trending topic, wherein the activity comprises a click-through, like, mention, or share, and wherein the second timeframe is a subset of the first timeframe.

5. The method of claim 1, wherein generating the news-event object comprises generating the tagging-algorithm by:
determining a location of the trending topic; and
identifying one or more posts within a second timeframe based on a location of each post matching the location of the trending topic, wherein the second timeframe is a subset of the first timeframe.

6. The method of claim 1, wherein generating the news-event object comprises generating the tagging-algorithm by:
accessing a social graph comprising a plurality of nodes and a plurality of edges connecting the nodes, each of the edges between two of the nodes representing a single degree of separation between them, and each node corresponding to an object associated with the online social network; and
identifying one or more topics based on identifying an entity corresponding to a node that is connected by an edge to a node associated with the trending topic.

7. The method of claim 1, further comprising storing references to the identified posts with the news-event object and the tagging-algorithm.

8. The method of claim 1, wherein the one or more posts from the first set of posts are posts made within a second timeframe associated with the trending topic, the second timeframe being a subset of the first timeframe.

9. The method of claim 1, wherein identifying one or more of the posts comprises searching one or more verticals to identify one or more posts stored by the verticals that match the trending topic.

10. The method of claim 1, further comprising sending a reference to the news-event object to a search frontend.

11. The method of claim 1, wherein the news-event object further comprises references to one or more of the identified posts.

12. The method of claim 1, wherein one or more of the search results further comprise references to one or more comments, news articles, photos, videos, events, applications, or web pages stored on the online social network.

13. The method of claim 1, further comprising calculating a relevance score for each of the identified posts based at least in part on a relevance of each identified post to the trending topic.

14. The method of claim 13, wherein each reference in one or more of the search-results modules corresponds to the identified posts with relevance scores greater than a threshold score.

15. The method of claim 1, further comprising storing a reference to the seed post with the news-event object.

16. The method of claim 1, wherein the generation of the search-results modules is responsive to receiving a search query from the client device of the user.

17. The method of claim 1, wherein the generation of the search-results modules is responsive to receiving a selection a link from the client device of the user.

18. The method of claim 1, further comprising:
associating the news-event object with the search query; and
sending the search results with the search query to a ranking backend.

19. One or more computer-readable non-transitory storage media embodying software that is operable when executed to:
- access, by a trending service component of an online social network, a first set of posts comprising a plurality of posts of the online social network posted within a first timeframe, each post being associated with one or more topics of a plurality of topics of the online social network;
- determine, by the trending service component, a trending topic from the plurality of topics of the online social network;
- generate, by a news event aggregator component of the online social network, a news-event object associated with the trending topic, the news-event object comprising a seed post from the first set of posts and executable instructions for a tagging-algorithm for identifying posts matching the trending topic, wherein the tagging-algorithm comprises one or more parameters corresponding to the trending topic associated with the news-event object, and wherein the parameters comprise one or more of:
  - an n-gram associated with the trending topic,
  - an entity associated with the trending topic,
  - a topic co-trending with the trending topic
  - a time of an event associated with the trending topic, or
  - a location of an event associated with the trending topic;
- identify, by executing the instructions of the tagging-algorithm by the news event aggregator component, one or more posts from the first set of posts that match the trending topic by:
  - generate a search query associated with the trending topic,
  - identify one or more posts from the first set of posts that match one or more of the parameters,
  - score the identified posts based on one or more of the parameters, and
  - select one or more of the posts having scores greater than a pre-determined threshold score;
- generate, by a news event post-analyzer, a plurality of search-results modules, each search-results module comprising a plurality of search results, each search result comprising a reference to an identified post that matches the trending topic; and
- send, to a client device of a user from a search frontend of the online social network, instructions for presenting a search-results page comprising the search-results modules.

20. A system comprising: one or more processors; and a memory coupled to the processors comprising instructions executable by the processors, the processors operable when executing the instructions to:
- access, by a trending service component of an online social network, a first set of posts comprising a plurality of posts of the online social network posted within a first timeframe, each post being associated with one or more topics of a plurality of topics of the online social network;
- determine, by the trending service component, a trending topic from the plurality of topics of the online social network;
- generate, by a news event aggregator component of the online social network, a news-event object associated with the trending topic, the news-event object comprising a seed post from the first set of posts and executable instructions for a tagging-algorithm for identifying posts matching the trending topic, wherein the tagging-algorithm comprises one or more parameters corresponding to the trending topic associated with the news-event object, and wherein the parameters comprise one or more of:
  - an n-gram associated with the trending topic,
  - an entity associated with the trending topic,
  - a topic co-trending with the trending topic
  - a time of an event associated with the trending topic, or
  - a location of an event associated with the trending topic;
- identify, by executing the instructions of the tagging-algorithm by the news event aggregator component, one or more posts from the first set of posts that match the trending topic by:
  - generate a search query associated with the trending topic,
  - identify one or more posts from the first set of posts that match one or more of the parameters,
  - score the identified posts based on one or more of the parameters, and
  - select one or more of the posts having scores greater than a pre-determined threshold score;
- generate, by a news event post-analyzer, a plurality of search-results modules, each search-results module comprising a plurality of search results, each search result comprising a reference to an identified post that matches the trending topic; and
- send, to a client device of a user from a search frontend of the online social network, instructions for presenting a search-results page comprising the search-results modules.

* * * * *